(12) United States Patent
Kishiyama et al.

(10) Patent No.: US 9,048,914 B2
(45) Date of Patent: Jun. 2, 2015

(54) RADIO BASE STATION DEVICE, MOBILE STATION DEVICE AND RADIO COMMUNICATION METHOD

(75) Inventors: Yoshihisa Kishiyama, Tokyo (JP); Kazuaki Takeda, Tokyo (JP); Motohiro Tanno, Tokyo (JP); Hidekazu Taoka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 602 days.

(21) Appl. No.: 13/378,681

(22) PCT Filed: Jun. 23, 2010

(86) PCT No.: PCT/JP2010/060614
§ 371 (c)(1),
(2), (4) Date: Mar. 9, 2012

(87) PCT Pub. No.: WO2010/150802
PCT Pub. Date: Dec. 29, 2010

(65) Prior Publication Data
US 2012/0155423 A1    Jun. 21, 2012

(30) Foreign Application Priority Data

Jun. 23, 2009  (JP) ................. 2009-149127
Oct. 5, 2009   (JP) ................. 2009-231861
Nov. 2, 2009   (JP) ................. 2009-252406
Jan. 6, 2010   (JP) ................. 2010-001417

(51) Int. Cl.
*H04W 4/00* (2009.01)
*H04B 7/06* (2006.01)
(Continued)

(52) U.S. Cl.
CPC ............ *H04B 7/0697* (2013.01); *H04B 7/0678* (2013.01); *H04J 13/0003* (2013.01); *H04J 13/004* (2013.01); *H04L 5/0048* (2013.01); *H04L 25/0204* (2013.01)

(58) Field of Classification Search
CPC ..................................................... H04W 72/04
USPC ................... 370/328–339; 375/350, 260, 130
See application file for complete search history.

(56) References Cited

U.S. PATENT DOCUMENTS

| 2006/0160496 A1* | 7/2006 | Murakami et al. ............ 455/102 |
| 2008/0232449 A1* | 9/2008 | Khan et al. .................... 375/220 |
| 2010/0246527 A1* | 9/2010 | Montojo et al. ............... 370/330 |

OTHER PUBLICATIONS

International Search Report w/translation from PCT/JP2010/060614 dated Aug. 3, 2010 (2 pages).

(Continued)

*Primary Examiner* — Iqbal Zaidi
(74) *Attorney, Agent, or Firm* — Osha Liang LLP

(57) ABSTRACT

Provided is a downlink reference signal structure suitable for increase in number of transmission layers. A radio base station device (20) has a plurality of transmission antennas; a orthogonal RS sequence generator (22) for generating orthogonal reference signals based on a two-dimensional orthogonal code, the orthogonal reference signals being orthogonalized between downlink reference signals adjacent in two-dimensional directions of frequency direction and time direction to each other in one transmission layer and being orthogonalized in different transmission layers assigned to one radio resource; a multiplexer (23) for multiplexing transmission data and the orthogonal reference signals in the one transmission layer; and a transmitter for transmitting a transmission signal obtained by multiplexing the transmission data and the orthogonal reference signals, via the transmission antenna in transmission layers simultaneously.

4 Claims, 19 Drawing Sheets

(51) Int. Cl.
  *H04J 13/00* (2011.01)
  *H04L 5/00* (2006.01)
  *H04L 25/02* (2006.01)

(56) References Cited

OTHER PUBLICATIONS

3GPP TSG RAN WG1 Meeting #57bis, R1-092797; "DL DM-RS Design for Rel-9 LTE"; NTT DoCoMo, Los Angeles, USA; Jun. 29-Jul. 3, 2009 (8 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

Notice of Reasons for Rejection for Japanese Application No. 2010-001417 dated Jul. 17, 2012, with English translation thereof (5 pages).

Notification of Reasons for Rejection for Japanese Application No. 2010-001417 dated Oct. 9, 2012, with English Translation thereof (8 pages).

3GPP TSG RAN WG1 meeting #56bis, R1-091517, "UE-specific RS design for LTE-A," CATT; Seoul, Korea, Mar. 23-27, 2009, with English translation thereof (8 pages).

* cited by examiner

RADIO BASE STATION DEVICE, MOBILE STATION DEVICE AND RADIO COMMUNICATION METHOD

TECHNICAL FIELD

The present invention relates to a radio base station device, a mobile station device and a radio communication method for transmitting downlink reference signals.

BACKGROUND ART

LTE (Long Term Evolution), which is a succeeding communication scheme to WCDMA (Wideband Code Division Multiple Access), HSDPA (High Speed Downlink Packet Access) and HSUPA (High Speed Uplink Packet Access), is defined in WCDMA standard organization 3GPP (Release-8). As a radio access scheme in Release-8 LTE (hereinafter referred to as "REL8-LTE"), there is PFDMA (Orthogonal Frequency Division Multiplexing Access) defined for downlink.

The OFDM scheme is a multi-carrier transmission scheme in which a frequency band is divided into a plurality of narrow frequency bands (subcarriers) and data is transmitted in each of the subcarriers. As the subcarriers are arranged densely in the frequency axis while orthogonalized, it is possible to realize higher-speed transmission and increase the frequency use efficiency.

Further, the REL8-LTE defines a downlink reference signal structure. The downlink reference signal is used for the purpose of 1) measuring a downlink CQI (Channel Quality Indicator) for scheduling and adaptive control, 2) channel estimation for downlink synchronous detection in a user terminal (hereinafter referred to as LTE terminal) that supports the REL8-LTE and 3) estimating a state of downlink transmission channel for cell search and handover.

Furthermore, the REL8-LTE defines a radio transmission method, MIMO (Multiple-Input Multiple-Output), for improving the communication quality by providing a plurality of antennas in each of a transmitter and a receiver (see NPL1). This MIMO is classified into single MIMO in which the transmission layers (transmission information sequences) to be transmitted simultaneously are all of one user and multiuser MIMO in which they are of different users.

In the single user MIMO, four transmission antennas at the maximum are used to spatially multiplex four layers at the base station. Each layer does not correspond one-to-one with a transmission antenna, but is transmission via all transmission antennas using different transmission phase/amplitude control (precoding). With precoding, layers ideally transmitted simultaneously are received as orthogonalized at the receiver (they do not interfere with each other). As such, a precoding vector (weighting of each transmission antenna) is determined in such a manner that transmission layers (transmission information sequences) to be transmitted simultaneously do not interfere with each other and in consideration of fading so as to receive with higher SINR at an LTE terminal. In addition, the precoding enables such beam forming as realizes directional transmission while emphasizing desired wave for a specific user terminal.

The multiuser MIMO is realized by allocating the same resource block of a certain subframe to layers of plural user terminals. In the multiuser MIMO, the number of layers to allocate to each user is limited to one.

CITATION LIST

Non-Patent Literature

Non-Patent Literature 1: 3GPP TR 25.913[1]

SUMMARY OF INVENTION

Technical Problem

As one improvement plan of the MIMO transmission technique, it is considered that the number of transmission layers is further increased. However, this has a problem of a downlink reference signal structure, that is, how the downlink reference signal is configured when the number of transmission layers is increased.

The present invention was carried out in view of the foregoing and aims to provide a radio base station device and a radio communication method capable of performing wireless communications with use of a downlink reference signal structure suitable for increase in number of transmission layers.

Solution to Problem

A first aspect of the present invention provides a radio base station device comprising: a plurality of transmission antennas; a reference signal generator for generating orthogonal reference signals based on a two-dimensional orthogonal code, the orthogonal reference signals being orthogonalized between downlink reference signals adjacent in two-dimensional directions of frequency direction and time direction to each other in one transmission layer and being orthogonalized in different transmission layers assigned to one radio resource; a multiplexer for multiplexing transmission data and the orthogonal reference signals in the one transmission layer; and a transmitter for transmitting a transmission signal obtained by multiplexing the transmission data and the orthogonal reference signals, via the transmission antenna in transmission layers simultaneously.

According to the first aspect, it is possible to orthogonalize the orthogonal downlink reference signals adjacent in the frequency direction in the one transmission layer, with use of the orthogonal code and also orthogonalize the orthogonal downlink reference signals adjacent in the time direction in the one transmission layer, with use of the orthogonal code. Besides, it is possible to orthogonalize the orthogonal downlink reference signals mapped to one allocation resource between transmission layers. That is, it is possible to orthogonalize the orthogonal downlink reference signals in three directions of frequency direction, time direction and between layers, with use of a simple two-dimensional orthogonal code, thereby allowing increasing in number of transmission layers and orthogonalizing between users.

Technical Advantage of the Invention

According to the present invention, it is possible to realize radio communications with use of a downlink reference signal structure suitable for increase in number of transmission layers.

DESCRIPTION OF EMBODIMENTS

With reference to the attached drawings, embodiments of the present invention will be described in detail below.

In one aspect of the present invention, DM-RSs (Demodulation-Reference Signal) which are reference signals used in demodulation of shared data channel (PDSCH) in an LTE-A terminal are orthogonalized in different transmission layers. The DM-RSs multiplex in transmission data of respective transmission layers are orthogonalized in plural different transmission layers (four layers, eight layers, or more), for which a suitable downlink reference signal structure is described below. Also described is a downlink reference signal structure suitable for orthogonalizing DM-RSs, which are to be orthogonalized in different transmission layers, in different users.

In the LTE system, in a base station (eNB), a scheduler uses a reported value of CQI (channel quality indicator) of each frequency block given from each terminal (UE) as a basis to allocate radio resources of downlink shared channel (PDSCH) by unit of resource block (RB) at intervals of subframes.

Figure 1:
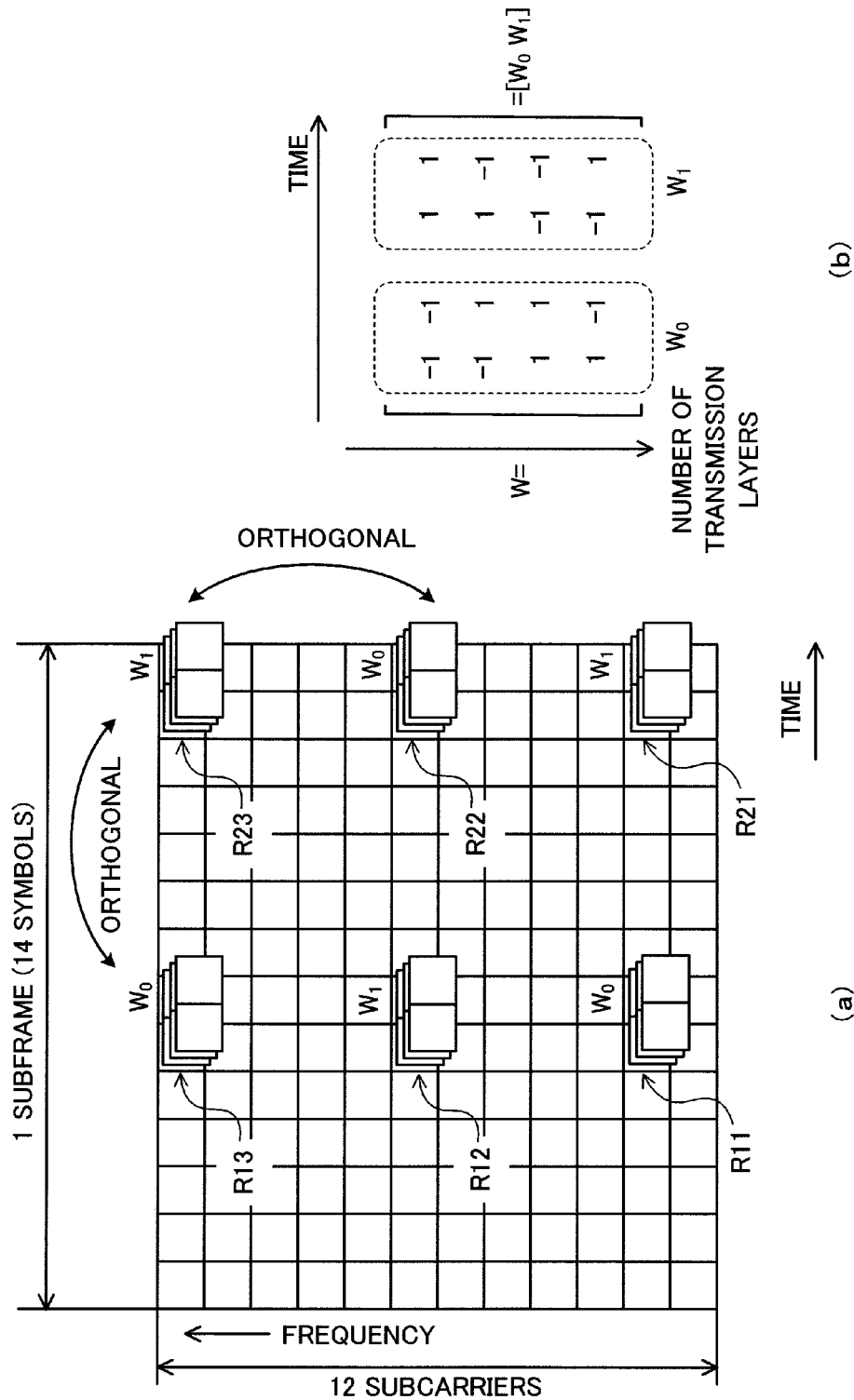
FIG. 1 is a conceptual diagram of a reference signal structure.

FIGS. 1(a) and 1(b) are conceptual diagrams of a downlink reference signal structure proposed by the inventors of the present invention.

FIG. 1(a) illustrates a DM-RS pattern per resource block. In this figure, a frequency domain is composed of successive 12 subcarriers in accordance with the size of one resource block defined in LTE, and each subframe of the resource block is composed of 14 symbols. In one resource block, transmission data and a DM-RS are multiplexed in such a manner as to prevent overlapping in time and frequency domains. A DM-RS is prepared for each transmission layer. For example, where there are eight transmission layers, totally eight DM-RSs are generated corresponding to the eight transmission layers. A radio resource (time and frequency domains) (hereinafter referred to as "allocation resource") allocated to the DM-RS of one layer is expressed by "one subcarrier×successive two symbols". Here, the size of allocation resource is not limited and may be set to "two subcarriers×successive two symbols".

In the example of FIG. 1(a), DM-RS of four transmission layers are multiplexed in one allocation resource. The multiplexing scheme of DM-RS adopted here is code division multiplexing (CDM) system. As DM-RSs of four transmission layers are multiplexed in one allocation resource, if at least two allocation resources separated from each other in the frequency direction are secured in one resource block, DM-RSs of totally eight transmission layers can be multiplexed. In FIG. 1(a), three allocation resources are arranged as separated from each other in the frequency direction in one resource block.

The DM-RSs of different transmission layers (four transmission layers) which are multiplexed to one allocation resource are orthogonal to each other. The DM-RSs multiplexed to one allocation resource are multiplied by four different orthogonal codes in accordance with the multiplex number so that the four DM-RSs of different transmission layers can be orthogonal to each other.

FIG. 1(b) illustrates an example of structure of two-dimensional orthogonal codes. The two-dimensional orthogonal codes W include a first orthogonal code W0 composed of 2×4 Walsh code and a second orthogonal code W1 composed of 2×4 Walsh code in which each line is orthogonal to a corresponding line of the first orthogonal code. The first and second orthogonal codes W0 and W1 are designed in size corresponding to the maximum multiplex number (four transmission layers) per allocation resource and an element size (1×2) of one allocation resource.

Specific description is made with reference to FIGS. 1(a), 1(b), 2 and 3.

At a certain symbol position (two successive symbols in one subframe), three allocation resources R11, R12 and R13 are arranged as equally separated from each other in frequency direction and two allocation resources R21, R22 and R23 are arranged at the same subcarriers of the allocation resources R11, R12 and R13, respectively and separated by a predetermined number of symbols in time axis direction.

Figure 2:
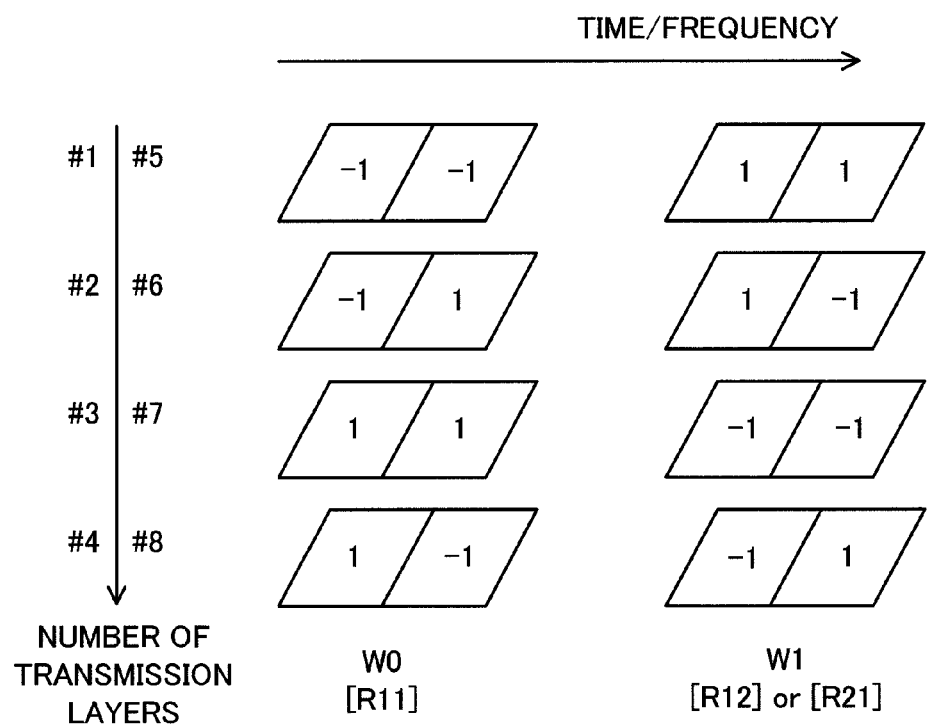
FIG. 2 is a conceptual diagram illustrating orthogonal DM-RSs that are orthogonal in different transmission layers and in two-dimensional directions.

Four DM-RSs corresponding to the first transmission layer #1 to the forth transmission layer #4 are code-division-multiplexed (CDM) to one allocation resource R11. Code division multiplexing of the four DM-RSs corresponding to the first transmission layer #1 to the forth transmission layer #4 multiplexed (CDM) to the allocation resource R11 is performed in such a manner that the DM-RSs are orthogonalized in the different transmission layers using the first orthogonal code W0. This also means that the DM-RSs corresponding to the first transmission layer #1 to the forth transmission layer #4 are multiplied by (−1, −1), (−1, 1), (1, 1), (1, −1) corresponding to the respective transmission layers and spread-multiplexed. FIG. 2 is a conceptual diagram of the four DM-RSs (first transmission layer #1 to fourth transmission layer

4) multiplexed to the allocation resource R11, which are code-division-multiplexed (orthogonalized) using the first orthogonal code W0. The DM-RSs (first transmission layer #1 to fourth transmission layer #4) are orthogonalized in the different transmission layers by the first orthogonal code W0.

The allocation resource R12 is a radio resource adjacent in the frequency direction to the allocation resource R11. Four DM-RSs corresponding to the fifth transmission layer #5 to the eighth transmission layer #8 multiplexed to the allocation resource R12 are code-division-multiplexed in such a manner that the DM-RSs are orthogonalized in the different transmission layers using the second orthogonal code W1. This also means that the DM-RSs corresponding to the fifth transmission layer #5 to the eighth transmission layer #8 are multiplied by (1, 1), (1, −1), (−1, −1), (−1, 1) corresponding to the respective transmission layers and spread-multiplexed. FIG. 2 is a conceptual diagram of the four DM-RSs (fifth transmission layer #5 to eighth transmission layer #8) multiplexed to the allocation resource R12, which are code-division-multiplexed (orthogonalized) using the second orthogonal code W1. The DM-RSs (fifth transmission layer #5 to eighth transmission layer #8) are orthogonalized in the different transmission layers by the second orthogonal code W1.

Further, the allocation resource R13 is a radio resource adjacent in the frequency direction to the allocation resource R12. Four DM-RSs (first transmission layer #1 to fourth transmission layer #4) multiplexed to the allocation resource R13 are code-division-multiplexed in such a manner that the DM-RSs are orthogonalized in the different transmission layers using the first orthogonal code W0.

In this way, the DM-RSs of respective transmission layers (first transmission layer #1 to fourth transmission layer #4) and (fifth transmission layer #5 to eighth transmission layer #8) multiplexed to the allocation resources R11, R12 and R13 are orthogonal to each other in the different transmission layers in the respective allocation resources R11, R12 and R13.

Besides, for the allocation resources adjacent to each other in the frequency direction (R11, R12), (R12, R13), one DM-RSs (first transmission layer #1 to fourth transmission layer #4) multiplexed to the allocation resources (R11, R13) are orthogonal-multiplexed (spread-multiplexed) using the first orthogonal code W0 and the other DM-RSs (fifth transmission layer #5 to eighth transmission layer #8) multiplexed to the allocation resource (R12) are orthogonal-multiplexed (spread-multiplexed) using the second orthogonal code W1. With this structure, orthogonalizing is performed between the allocation resources adjacent in the frequency direction (R11, R12) and between the allocation resources adjacent in the frequency direction (R12, R13).

As illustrated in FIG. 1(a), other three allocation resources R21, R22 and R23 are arranged at the same subcarriers of the above-mentioned three allocation resources R11, R12 and R13, respectively, and separated by a predetermined number of symbols in the time axis direction.

The allocation resource R21 is adjacent to the above-mentioned allocation resource R11 in the time axis direction. Four DM-RSs corresponding to the fifth transmission layer #5 to the eighth transmission layer #8 are multiplexed to the allocation resource R21. The four DM-RSs (fifth transmission layer #5 to eighth transmission layer #8) multiplexed to the allocation resource R21 are code-division-multiplexed in such a manner that that the DM-RSs are orthogonalized in the different transmission layers using the second orthogonal code W1. FIG. 2 is a conceptual diagram of the four DM-RSs (fifth transmission layer #5 to eighth transmission layer #8) multiplexed to the allocation resource R21, which are code-division-multiplexed (orthogonalized) using the second orthogonal code W1. The DM-RSs (fifth transmission layer #5 to eighth transmission layer #8) are orthogonalized in the different transmission layers by the second orthogonal code W1.

The allocation resource R22 is adjacent to the above-mentioned allocation resource R12 in the time axis direction. Four DM-RSs corresponding to the first transmission layer #1 to the fourth transmission layer #4 are multiplexed to the allocation resource R21. The four DM-RSs (first transmission layer #1 to fourth transmission layer #4) multiplexed to the allocation resource R22 are code-division-multiplexed in such a manner that that the DM-RSs are orthogonalized in the different transmission layers using the first orthogonal code W0.

The allocation resource R23 is adjacent to the above-mentioned allocation resource R13 in the time axis direction. Four DM-RSs corresponding to the fifth transmission layer #5 to the eighth transmission layer #8 are multiplexed to the allocation resource R23. The four DM-RSs (fifth transmission layer #5 to eighth transmission layer #8) multiplexed to the allocation resource R23 are code-division-multiplexed in such a manner that that the DM-RSs are orthogonalized in the different transmission layers using the second orthogonal code W1.

In this way, for the allocation resources adjacent to each other in the time axis direction (R11, R21), (R12, R22) and (R13, R23), one DM-RSs (first transmission layer #1 to fourth transmission layer #4) multiplexed to the allocation resources (R11, R13, R22) are orthogonal-multiplexed (spread-multiplexed) using the first orthogonal code W0 and the other DM-RSs (fifth transmission layer #5 to eighth transmission layer #8) multiplexed to the allocation resource (R21, R12, R23) are orthogonal-multiplexed (spread-multiplexed) using the second orthogonal code W1. With this structure, orthogonalizing is performed between the allocation resources adjacent in the time axis direction (R11, R21), between the allocation resources adjacent in the time axis direction (R12, R22) and between the allocation resources adjacent in the time axis direction (R13, R23).

Figure 3:
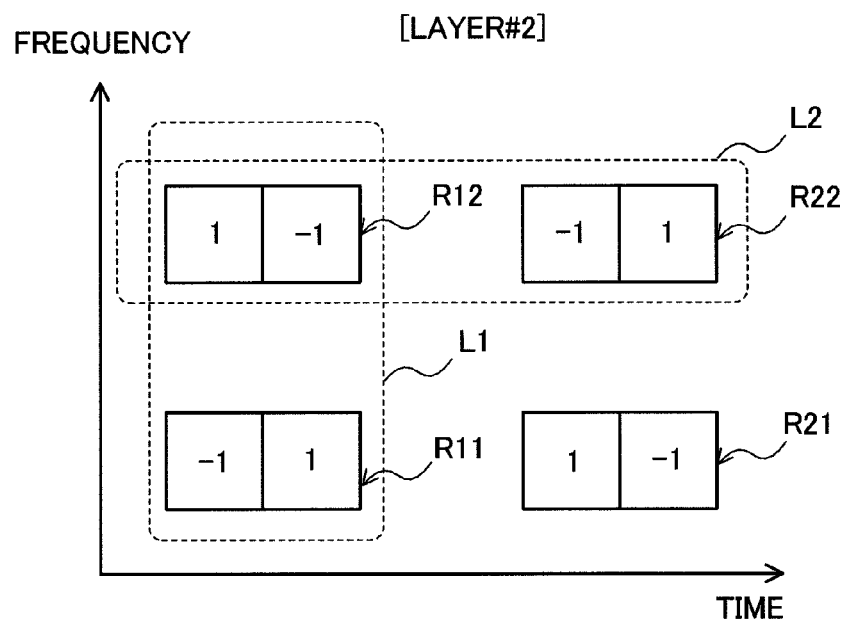
FIG. 3 is a conceptual diagram of the orthogonalization of the orthogonal DM-RSs that are adjacent in the to-dimensional directions in the same transmission layer.

FIG. 3 is a conceptual view of DM-RSs which are orthogonalized in two-dimensional directions composed of the frequency axis direction and time axis direction. FIG. 3 illustrates the orthogonal state in the transmission layer #2 of the four allocation resources R11, R12, R21 and R22 that are adjacent to each other in the two-dimensional directions (frequency axis direction and time axis direction). As illustrated in FIG. 3, in the same transmission layer #2, the DM-RSs in the allocation resources R11 and R12 adjacent to each other in the frequency axis direction enclosed in the dotted line L1 are orthogonal to each other and the DM-RSs in the allocation resources R12 and R22 adjacent to each other in the time axis direction enclosed in the dotted line L2 are orthogonal to each other. This orthogonalizing in the two-dimensional directions is assured in all of the transmission layers.

In the above description, the DM-RSs corresponding to the first transmission layer #1 to the fourth transmission layer #4 are code-division-multiplexed using the first orthogonal code W0 that is one two-dimensional orthogonal code Wand the DM-RSs corresponding to the fifth transmission layer #5 to the eighth transmission layer #8 are code-division-multiplexed using the second orthogonal code W1 that is the other two-dimensional orthogonal code W. This is not intended for limiting the present invention.

In another aspect of the present invention, the DM-RSs are orthogonalized in different users using the first orthogonal code W0 and the second orthogonal code W1 of the two-dimensional orthogonal codes W. In this case, for example, in the first orthogonal code W0 illustrated in FIG. 1(b), first two codes (−1, −1) and (−1, 1) are allocated to the user UE1 (layers #1 to #2) and the following two codes (1, 1) and (1, −1) are allocated to the user UE2 (layers #1 to #2). In the resource block illustrated in FIG. 1(a), the different users UE1 and UE2 are allocated to the allocation resources that are adjacent to each other in the frequency axis direction.

The DM-RSs of plural layers (first transmission layer #1 and second transmission layer #2) for the user UE1 are code-division-multiplexed to the allocation resource R11 (R13) to which the users UE1 and UE2 are allocated, using the first two codes of the first orthogonal code W0 and the DM-RSs of plural layers (first transmission layer #1 and second transmission layer #2) for the user UE2 are also code-division-multiplexed to the allocation resource R11 (R13) using the following two codes of the first orthogonal code W0.

Also for the allocation resource R12 that is adjacent to the allocation resource R11 (R13) in the frequency axis direction, the DM-RSs of the plural layers (third transmission layer #3 and fourth transmission layer #4) for the user UE1 are code-division-multiplexed to the allocation resource R12 using the first two codes of the second orthogonal code W1 and the DM-RSs of the plural layers (third transmission layer #3 and fourth transmission layer #4) for the user UE2 are code-division-multiplexed to the allocation resource R12 using the following two codes of the second orthogonal code W1.

In this way, signals of plural users are orthogonally multiplexed in each allocation resource and orthogonalizing of the DM-RSs (first transmission layer #1 and second transmission layer #2) and (third transmission layer #3 and fourth transmission layer #4) of the plural users can be performed in the allocation resources R11 (R13) and R12 that are adjacent in the frequency axis direction to each other.

Besides, in the resource block illustrated in FIG. 1(a), also for the allocation resource R21 that is adjacent to the allocation resource R11 in the time axis direction, the DM-RSs of plural layers (third transmission layer #3 and fourth transmission layer #4) for the user UE1 are code-division-multiplexed to the allocation resource R21 using the first two codes of the second orthogonal code W1 and the DM-RSs of plural layers (third transmission layer #3 and fourth transmission layer #4) for the user UE2 are code-division-multiplexed to the allocation resource R21 using the following two codes of the second orthogonal code W1.

In this way, orthogonalizing of DM-RSs (first transmission layer #1 and second transmission layer #2) and DM-RSs (third transmission layer #3 and fourth transmission layer #4) for the plural users can be performed between the allocation resources R11 and R21 that are adjacent to each other in the time axis direction.

In the same way, orthogonalizing between users can be performed in the allocated allocation resources R12 and R22 and orthogonalizing can be performed between layers, and also, orthogonalizing between users can be performed in the allocated allocation resources R13 and R23 and orthogonalizing can be performed between layers.

Next description is made about an example of a radio communication method using downlink DM-RSs that are orthogonalized as described above and of a radio base station device and a radio terminal to which the radio communication method applies. The description is given by way of example of a radio access system designed for LTE and LTE-A systems, but the present invention is also applicable to other systems.

Figure 4:
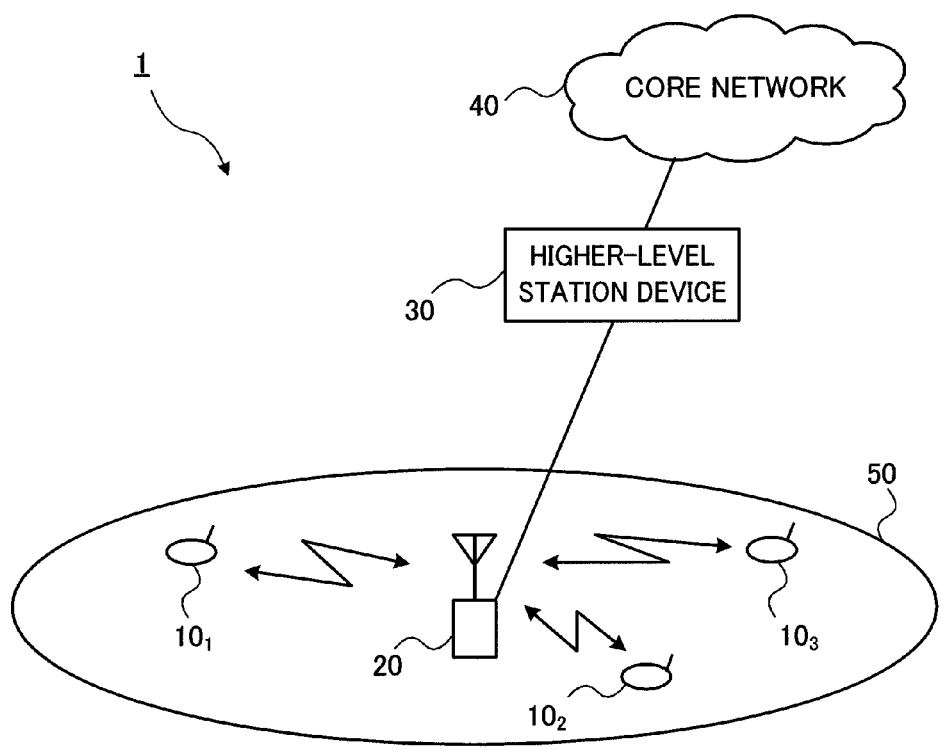
FIG. 4 is a schematic diagram of a mobile communication system having user terminals and a radio base station device.
Figure 5:
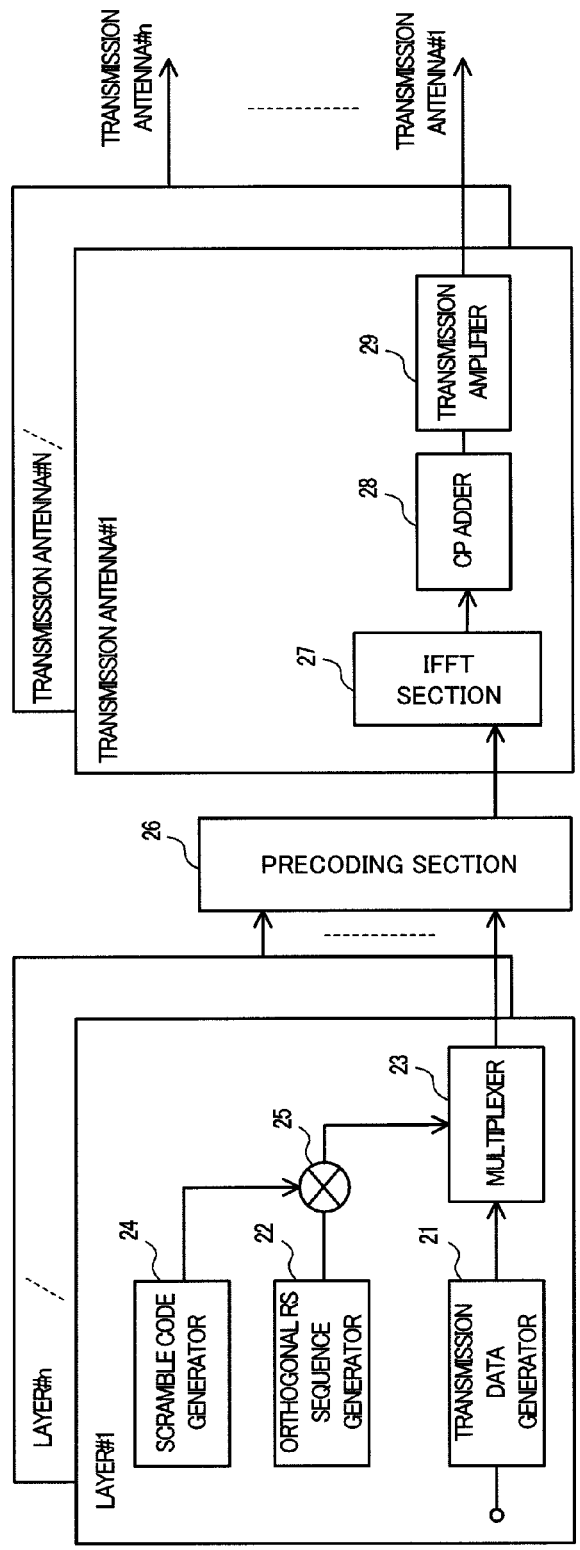
FIG. 5 is a functional block diagram of the radio station device according to the one embodiment.

With reference to FIG. 4, first description is made about a mobile communication system having user terminals (for example, mobile stations) and a radio base station device.

The mobile communication system 1 is based on the LTE system, to which the radio communication method using CRS, CQI-RS, DM-RS as a downlink reference signal is applied. The mobile communication system 1 has a radio base station device 20, and a plurality of user terminals 10 ($10_1$, $10_2$, $10_3$, ..., $10_n$, is a positive integer) that performs communications with the radio base station device 20. The radio base station device 20 is connected to a higher-level station, for example, an access gateway device 30, which is connected to a core network 40. Each user terminal 10 performs communications with the radio base station device 20 in a cell 50. Here, the access gateway device 30 may be called MME/SGW (Mobility Management Entity/Serving Gateway).

As user terminals ($10_1$, $10_2$, $10_3$, ..., $10_n$) have the same structures, functions and states, they are collectively explained as a user terminal 10 except where specifically noted. For convenience of explanation, it is a mobile station that performs radio communications with the radio base station device, but more typically, it is a user terminal (UE: User Equipment) including a mobile terminal and a fixed terminal.

In the mobile communication system 1, as the radio access system, OFDMA (Orthogonal Frequency Division Multiple Access) is applied to the downlink and SC-FDMA (Single Carrier-Frequency Division Multiple Access) is applied to the uplink. As described above, the OFDMA is a multi-carrier transmission scheme in which a frequency band is divided into a plurality of narrower frequency bands (subcarriers) and data is mapped to each subcarrier for communications. The SC-FDMA is a single carrier transmission scheme in which a system band is divided into bands composed of one or successive resource blocks per terminal and plural terminals use different bands thereby to reduce interference between the terminals.

Here, description is made about a communication channel in the LTE system.

Used in the downlink are a reference signal for transmitting CRS, CQI-RS and DM-RS that are downlink reference signals, a physical downlink shared channel (PDSCH) shared by user terminals and a physical downlink control channel (downlink L1/L2 control channel). The reference signal is used to transmit a DM-RS with application of the above-mentioned multiplexing method. The physical downlink shared channel is used to transmit user data signals. The physical downlink control channel is used to notify DM-RS sequence information, scheduling information, user ID for performing communication with use of the physical downlink shared channel, transport format information of the user data, that is, downlink scheduling information, user ID for performing communications with use of the physical uplink shared channel and the transport format information of the user data, that is, Uplink Scheduling Grant. DM-RS sequence information is information for notifying user terminals of which index is used by PDCCH or higher layer signaling, when the DM-RSs define transmission layers #1 to #8 by indexes and single stream transmission is applied. When the multiplayer transmission is applied, a control signal is used to inform which index is used by other users multiplexed to the same resource blocks.

Besides, in the downlink, broadcast channels such as Physical-Broadcast Channel (P-BCH) and Dynamic Broadcast Channel (D-BCH) are transmitted. Information to transmit in the P-BCH is Master Information Block (MIB) and information to transmit in the BCH is System Information Block (SIB). The D-BCH is mapped to PDSCH and transmitted to the user terminal 10 by the radio base station device 20.

In the uplink, the physical uplink shared channel (PUSCH) shared in user terminals 10 and the physical uplink control channel (PUSCH) which is uplink control channel are used. The physical uplink shared channel is used to transmit user data. The physical uplink control channel is used to transmit precoding information for downlink MIMO transmission, ACK/NACK for downlink shared channel, downlink radio quality information (CQI: Channel Quality Indicator) and the like.

In addition, in the uplink, a physical random access channel (PRACH) is defined for initial connection or the like. The user terminal 10 transmits a random access preamble in the PRACH.

Next description is made about the radio base station device 20 according to an embodiment of the present invention. The radio base station device 20 has a plurality of transmission antennas #1 to #N and transmission data and downlink reference signals (containing DM-RSs) of transmission layers are transmitted simultaneously from the plural transmission antennas. Here, it is assumed that the actual number of transmission antennas is eight for convenience for explanation. That is, the maximum number of transmission layers can be eight.

The radio base station device 20 has a transmission data generator 21 for generating transmission data, an orthogonal RS sequence generator 22 for generating an orthogonal DM-RS, a multiplexer 23 for multiplexing transmission data and an orthogonal DM-RS, a scramble processor code generator 24 for generating a scramble code and a scramble processing section 25 for scrambling by multiplying the orthogonal DM-RS by the scramble code. In the radio base station device 20, generation of transmission data, generation of an orthogonal DM-RS, generation of a scramble code and multiplexing of transmission data and an orthogonal DM-RS are performed per transmission layer.

The transmission data generator 21 performs error correction coding and interleaving on a symbol sequence of the transmission data. In the LTE system, a turbo code is defined as a code having error correction ability for coding of the transmission data. However, when the pre sent invention is applied to a system other than the LTE system, it is preferable that a coding scheme suitable for the radio communication system is applied. After error correction coding and interleaving of the transmission data, the transmission data generator 21 performs serial-parallel conversion on the transmission data sequence (n bits that form one OFDM signal) to generate a data signal of plural sequences for subcarrier modulation. Interleaving may be performed after generation of the data signal of plural sequences. The transmission data generator 21 performs subcarrier modulation on the data signal of plural sequences in parallel. In the subcarrier modulation, modulation schemes such as BPSK, QPSK, 16QAM and the like may be adopted.

The orthogonal RS sequence generator 22 generates an orthogonal DM-RS using a two-dimensional orthogonal code (W=[W0 W1]). Corresponding to the maximum number of transmission layers (=8), eight orthogonal RS sequence generators 22 operate in parallel. In order to distinguish the transmission layers in this description, "#n" is added to follow the reference numeral "22" for convenience of description.

Orthogonal DM-RSs corresponding to the transmission layers #1 to #4 are generated by the orthogonal RS sequence generators 22 (#1 to #4). The orthogonal RS sequence generator 22 (#1) generates an orthogonal DM-RS which is multiplexed to the transmission data of the transmission layer #1. The orthogonal RS sequence generator 22 (#1) generates the orthogonal DM-RS by multiplying the DM-RS of the transmission layer 1 by the first line (−1, −1) of the first orthogonal code W0. In the same way, the orthogonal RS sequence generators 22 (#2 to #4) corresponding to the other transmission layers #2 to #4 multiply the DM-RS of the transmission layer #2 by the second line (−1, 1) of the first orthogonal code W0, the DM-RS of the transmission layer #3 by the third line (1, 1) of the first orthogonal code W0 and the DM-RS of the transmission layer #4 by the fourth line (1, −1) of the first orthogonal code W0. In this way, the orthogonal DM-RSs in the transmission layers #1 to #4 orthogonal to each other are generated.

Besides, orthogonal DM-RSs corresponding to the transmission layers #5 to #8 are generated by the orthogonal RS sequence generators 22 (#5 to #8). The orthogonal RS sequence generator 22 (#5) generates an orthogonal DM-RS which is multiplexed to the transmission data of the transmission layer #5. The orthogonal RS sequence generator 22 (#5) generates the orthogonal DM-RS by multiplying the DM-RS of the transmission layer 5 by the first line (1, 1) of the second orthogonal code W1. In the same way, the orthogonal RS sequence generators 22 (#6 to #7) corresponding to the other transmission layers #6 to #8 multiply the DM-RS of the transmission layer #6 by the second line (1, −1) of the second orthogonal code W1, the DM-RS of the transmission layer #7 by the third line (−1, −1) of the second orthogonal code W1 and the DM-RS of the transmission layer #8 by the fourth line (−1, 1) of the second orthogonal code W1. In this way, the orthogonal DM-RSs in the transmission layers #5 to #6 orthogonal to each other are generated.

In this way, the orthogonal DM-RSs of the four transmission layers #1 to #4 generated by the orthogonal RS sequence generator 22 (#1 to #4) are multiplexed to the same allocation resources (R11, R13, R22). Accordingly, in each of the allocation resources (R11, R13, R22), the orthogonal DM-RSs of the four transmission layers #1 to #4 are orthogonally multiplexed.

Besides, the orthogonal DM-RSs of the four transmission layers #5 to #8 generated by the orthogonal RS sequence generator 22 (#5 to #8) are multiplexed to the same allocation resources (R12, R21, R23). Accordingly, in each of the allocation resources (R12, R21, R23), the orthogonal DM-RSs of the four transmission layers #5 to #6 are orthogonally multiplexed.

As illustrated in FIG. 1(a), in this example, a group of the DM-RSs of the four transmission layers #1 to #4 and a group of the DM-RSs of the four transmission layers #5 to #8 are multiplexed separately. The allocation resources (R12, R21, R23) to which the orthogonal DM-RSs of the transmission layers #5 to #8 and the allocation resources (R11, R13, R22) to which the orthogonal DM-RSs of the transmission layers #1 to #4 are arranged to be adjacent both in the frequency axis direction and in the time axis direction. Accordingly, in the transmission layers #1 to #4 and the transmission layers #5 to #8, the DM-RSs adjacent in the frequency axis direction are orthogonal to each other and the DM-RSs adjacent in the time axis direction are orthogonal to each other.

In the above description, the reference signal structure of DM-RSs is based on the number of transmission layers "8". As described above, the DM-RSs may be orthogonalized using the two-dimensional orthogonal code (W=[W0, W1]) illustrated in FIG. 1(b) assuming that the maximum number of transmission layers is four.

The orthogonal RS sequence generators 22 correspond to the maximum number of transmission layers (=4) for each of two user terminals UE1 and UE2 and totally, eight orthogonal RS sequence generators at the maximum can operate in parallel. In this description, in order to distinguish the transmission layers from the users, "Un#n" is added to follow the reference numeral "22" for convenience of explanation.

The first two codes of the first and second orthogonal codes W0 and W1 are applied to the user UE1 and the following two codes are applied to the user UE2. Besides, the first two codes of the first and second orthogonal codes W0 and W1 are applied to the user UE1 and the following two codes are applied to the user UE2.

The orthogonal DM-RSs corresponding to the transmission layers #1 and #2 of the user UE1 are generated by the orthogonal RS sequence generators 22 (U1#1, U1#2). The orthogonal RS sequence generator 22 (U1#1) multiplies the DM-RS sequence of the transmission layer #1 by the first line (−1, −1) of the first orthogonal code W0 to generate the orthogonal DM-RS. In the same way, the orthogonal RS sequence generator 22 (U1#2) corresponding to the transmission layer #2 multiplies the DM-RS sequence of the transmission layer #2 by the second line (−1, 1) of the first orthogonal code W0. On the other hand, the orthogonal DM-RS corresponding to the transmission layer #1 of the user UE2 is generated by the orthogonal RS sequence generator 22 (U2#1). The orthogonal RS sequence generator 22 (U2#1) multiplies the DM-RS sequence of the transmission layer #1 by the third line (1, 1) of the first orthogonal code W0 to generate the orthogonal DM-RS. In the same way, the orthogonal RS sequence generator 22 (U2#2) corresponding to the transmission layer #2 multiplies the DM-RS sequence of the transmission layer #2 by the fourth line (1, −1) of the first orthogonal code W0.

Further, the orthogonal DM-RSs corresponding to the transmission layers #3 and #4 of the user UE1 are generated by the orthogonal RS sequence generators 22 (U1#3, U1#4). The orthogonal RS sequence generator 22 (U1#3) multiplies the DM-RS sequence of the transmission layer #3 by the first line (1, 1) of the second orthogonal code W1 to generate the orthogonal DM-RS. In the same way, the orthogonal RS sequence generator 22 (U1#4) corresponding to the transmission layer #4 multiplies the DM-RS sequence of the transmission layer #4 by the second line (1, −1) of the second orthogonal code W1. The orthogonal DM-RSs corresponding to the transmission layers #3 and #4 of the user UE2 are generated by the orthogonal RS sequence generators 22 (U2#3, U2#4). The orthogonal RS sequence generator 22 (U2#3) multiplies the DM-RS sequence of the transmission layer #3 by the third line (−1, −1) of the second orthogonal code W1 to generate the orthogonal DM-RS. In the same way, the orthogonal RS sequence generator 22 (U2#4) corresponding to the transmission layer #4 multiplies the DM-RS sequence of the transmission layer #4 by the fourth line (−1, 1) of the second orthogonal code W1.

In this way, the orthogonal DM-RSs of the transmission layers #1 and #2 generated by the orthogonal RS sequence generators 22 (U1#1, U1#2) for the user terminal UE1 and the orthogonal DM-RSs of the transmission layers #1 and #2 generated by the orthogonal RS sequence generators 22 (U2#1, U2#2) for the user terminal UE2 are multiplexed to the same allocation resources (R11, R13, R22).

Besides, the orthogonal DM-RSs of the transmission layers #3 and #4 generated by the orthogonal RS sequence generators 22 (U1#3, U1#4) for the user terminal UE1 and the orthogonal DM-RSs of the transmission layers #3 and #4 generated by the orthogonal RS sequence generators 22 (U2#3, U2#4) for the user terminal UE2 are multiplexed to the same allocation resources (R12, R21, R23).

The scramble code generator 24 generates a scramble code for making peripheral cell interference random. Two scramble methods including a user-specific scramble and a cell-specific scramble may be applied. When the user-specific scramble is applied, scramble codes allocated to the users uniquely are used to scramble the orthogonal DM-RSs. The scramble sequence may be determined by the user ID given to each user or may be communicated to the user terminal by higher layer signaling. When the cell-specific scramble is applied, the scramble code may be determined by a cell ID of the connection cell (cell that receives the PDCCH9 or may be given from the connection cell by higher layer signaling (broadcast information or the like).

Figure 6:
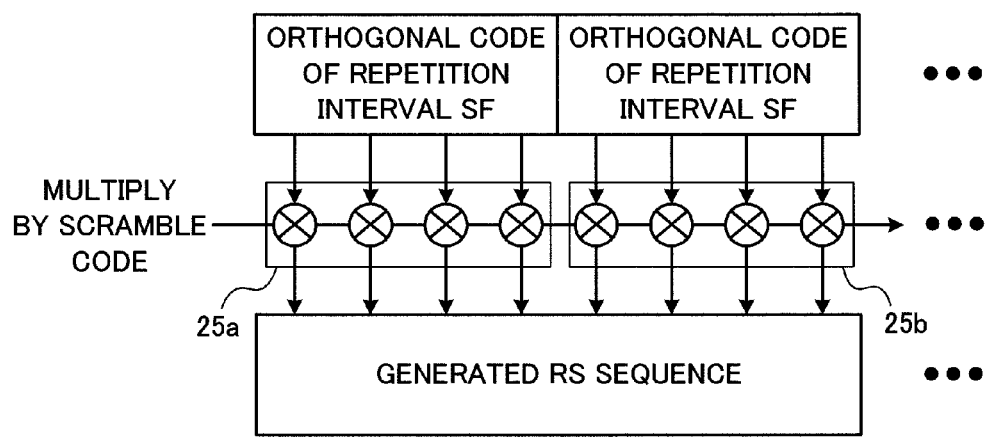
FIG. 6 is a conceptual diagram of a scramble processing section for scrambling between orthogonal codes.

FIG. 6 illustrates a scramble method when the user-specific scramble method is applied.

The scramble processing section 25 has two multipliers 25a and 25b corresponding to orthogonal code sections. In an orthogonal code section, the same modulation symbol is multiplied to assure that the orthogonal code itself is not scrambled and only a part between the orthogonal codes is scrambled. For example, one multiplier 25a multiplies (1, 1, 1, 1) as the same modulation symbol and the other multiplier 25b multiplies (−1, −1, −1, −1) as the same modulation symbol. With this structure, scramble is performed between the orthogonal codes and is not performed within the orthogonal code section.

The scramble method of multiplying the same modulation symbol in the orthogonal code section and scrambling between the orthogonal codes is expressed by the equation (1).

$$RS(i)=o(i \bmod(SF)) \times s(<<i/SF>>) \quad (1)$$

In the equation (1), a reference signal sequence (RS) of a sequence i is repeated at intervals of SF for the orthogonal sequence (o) and scrambled at intervals of SF. $<<i/SF>>$ is a quotient obtained by dividing SF by i.

When the user-specific scramble method is applied, it is significant that scramble is not performed in the orthogonal code section. As the orthogonal code is not scrambled, if scramble sequences are different, orthogonalization by the code is possible. That is, even between users of different connection cells (scramble sequences are differed), the DM-RSs can be orthogonalized and this is effective in application to multi-user MIMO over plural cells.

Figure 7:
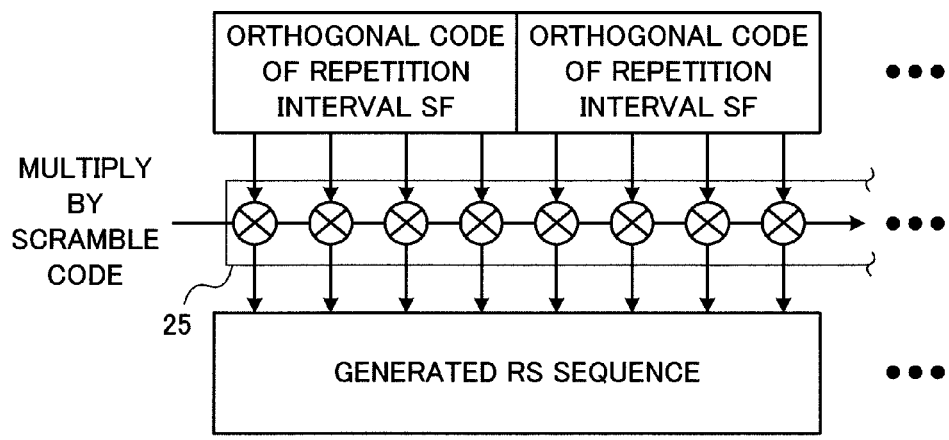
FIG. 7 is a conceptual diagram of the scramble processing section for scrambling between orthogonal codes.

FIG. 7 illustrates concept of the scramble method when the cell-specific scramble method is applied.

The scramble processing section 25 multiplies the orthogonal codes by the cell-specific scramble codes.

The scramble method of multiplying the orthogonal codes by the cell-specific scramble codes can be expressed in the equation (2).

$$RS(i)=o(I \bmod(SF)) \cdot s(i) \quad (2)$$

Here, the scramble method of the equation (1) for scrambling between orthogonal codes only may be applied to the cell-specific scramble method, or the scramble method of the equation (2) for scrambling the orthogonal codes may be applied to the user-specific scramble method.

The following description is made about the case where a scramble code for scrambling not orthogonal codes but between the orthogonal codes is extended to a two-dimensional orthogonal code.

The scrambling method for keeping orthogonality in two dimensions (frequency and time directions) is expressed by the equation (3).

$$RS(t,f)=o(t \bmod(SF_t), f \bmod(SF_f)) \cdot s(<<t/SF_t>>,<<f/SF_f>>) \quad (3)$$

In the equation (3), the reference signal sequence (RS) is expressed in two dimensions of time (t) and frequency (f). As to the orthogonal sequence (o), the time domain repeats at intervals of $SF_t$ and the frequency domain repeats at intervals of $SF_f$, and as to scrambling, the time domain is scrambled at intervals of $SF_t$ and the frequency domain is scrambled at intervals of $SF_f$. That is, in this scramble method, scrambling is performed per resource block.

The scrambling method for keeping orthogonality of the time domain only is expressed by the equation (4).

$$RS(t,f)=o(t\cdot\mathrm{mod}(SF_t),f\cdot\mathrm{mod}(SF_f))\cdot s(<<t/SF_t>>,f) \quad (4)$$

In the equation (4), as to scrambling, the time domain is scrambled at intervals of $SF_t$, however, the frequency domain is always scrambled. That is, the orthogonality of the orthogonal codes is maintained in the time domain but not in the frequency domain. This method is for improving the scramble effect in the frequency domain when scrambling per resource block as expressed in the equation (3) has little effect.

Further, the scrambling method for keeping orthogonality of the time domain only is expressed by the equation (5).

$$RS(t,f)=o(t\cdot\mathrm{mod}(SF_t),f\cdot\mathrm{mod}(SF_f))\cdot s(t,<<f/SF_f>>) \quad (5)$$

In the equation (5), as to scrambling, the frequency domain is scrambled at intervals of $SF_f$, however, the time domain is always scrambled. That is, the orthogonality of the orthogonal codes is maintained in the frequency domain but not in the time domain. This method is for improving the scramble effect in the time domain when scrambling per resource block as expressed in the equation (3) has little effect.

The multiplexer 23 multiplexes the transmission data and the orthogonal DM-RS on one resource block in such a manner that they do not overlap each other. In FIG. 1(a), the transmission data is mapped to white resource elements and the orthogonal DM-RS is mapped to the above-described allocation resources R11 to R13 and R21 to R23. Here, the transmission data and the orthogonal DM-RS are multiplexed per transmission layer.

The precoding section 26 determines a precoding vector in consideration of fading fluctuation in such a manner as to prevent interference in transmission layers to transmit simultaneously and to allow reception with high SINR at a user terminal. The user terminal chooses such a PMI (Precoding Matrix Indicator) that the reception SINR of each transmission layer is maximum and feeds it back.

The IFFT section 27 performs Inverse Fast Fourier Transform on a transmission signal (subcarrier signal) in the frequency domain to which the transmission data and the orthogonal DM-RS are subcarrier-mapped. With this Inverse Fast Fourier Transform, a frequency-component signal allocated to a subcarrier is transformed to a time-component signal line. Then, a CP adder 28 adds a cyclic prefix, a transmission amplifier 29 amplifies power and then, the signal is transmitted via a transmission antenna.

Figure 8:
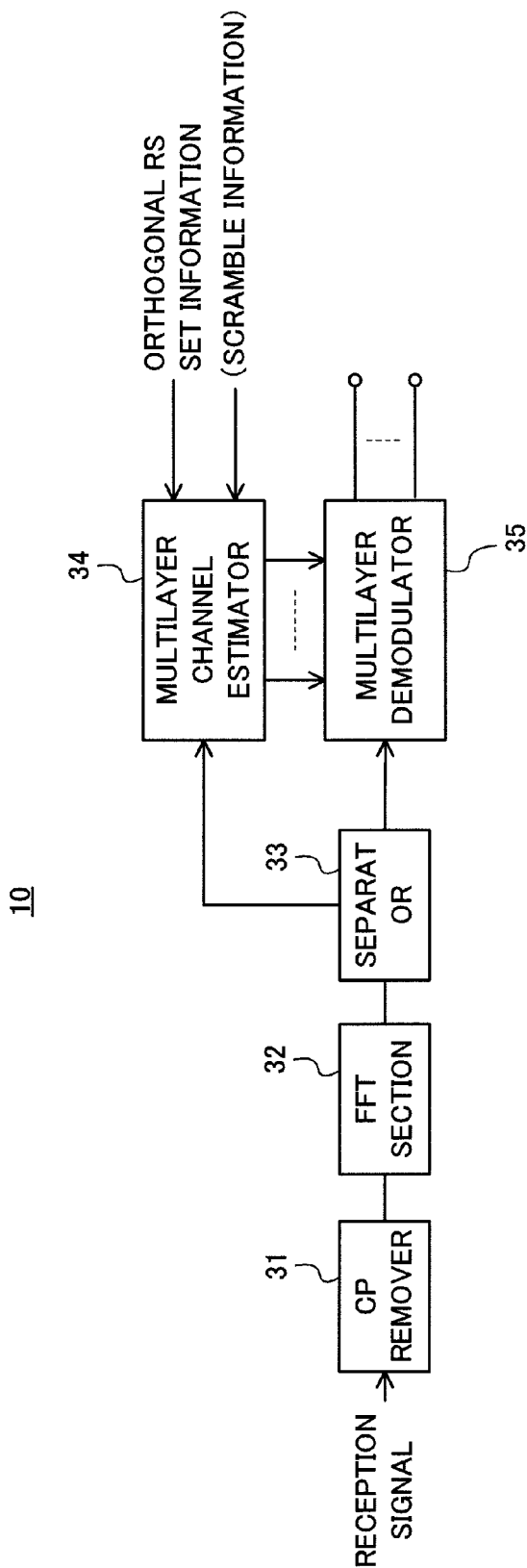
FIG. 8 is a functional block diagram of a user terminal according to the one embodiment.

With reference to FIG. 8, description is made about the user terminal 10 according to the embodiment of the present invention.

A reception processing system of the user terminal 10 receives a signal to which the orthogonal DM-RS and the transmission data are multiplexed per transmission layer as described above. A reception signal is input to a CP remover 31, in which the cyclic prefix is removed. A FFT section 32 performs Fast Fourier Transform on the CP-removed reception signal so that the time-sequence signal component is transformed into a frequency component line. A separator 33 performs subcarrier-demapping of the reception signal and separates a reference signal for transmitting the RS sequence signal, a control channel (for example, PHICH, PDCCH) for transmitting downlink control information and a shared channel (for example, PDSCH) for transmitting the transmission data.

In reception symbols of the reference signal, the orthogonal DM-RS is input to a multi-layer channel estimator 34. And, the PDSCH is input to a multi-layer demodulator 35 which is a demodulator of downlink transmission data.

The multi-layer channel estimator 34 uses the DM-RS sequence information (orthogonal RS set information relating to the two-dimensional orthogonal code W) obtained by decoding the PDCCH (PDSCH) to obtain a DM=RS of a corresponding transmission layer and performs channel estimation of the transmission layer using the DM-RS. This multi-layer channel estimation is used as a basis to demodulate the transmission data.

Besides, when the downlink DM-RS is scrambled by the user-specific scramble method, scramble information is communicated by higher layer signaling. The scramble information contains a repetition interval $SF_f$ of the frequency domain, a repetition interval $SF_t$ of the time domain and information for specifying a scramble code corresponding to each orthogonal code section. The multi-layer channel estimator 34 descrambles the DM-RS in accordance with the communicated scramble information.

As described above, according to the present embodiment, as the two-dimensional orthogonal code (W=[W0 W1]) is used to orthogonalized DM-RSs, among the DM-RSs mapped in a two-dimensional plane on the resource block, DM-RSs adjacent to each other in the frequency axis direction in the same transmission layer can be orthogonalized to each other and DM-RSs to each other in the time axis direction can be orthogonalized. Further, the DM-RSs mapped to the same allocation resource can be orthogonalized in different transmission layers. In other words, the simple two-dimensional orthogonal code (W=[W0 W1]) is used to allow three types of orthogonalizing of DM-RSs in the frequency axis direction, time axis direction and in different layers, and thereby, it is possible to increase the number of transmission layers and achieve orthogonality between users.

Figure 9:
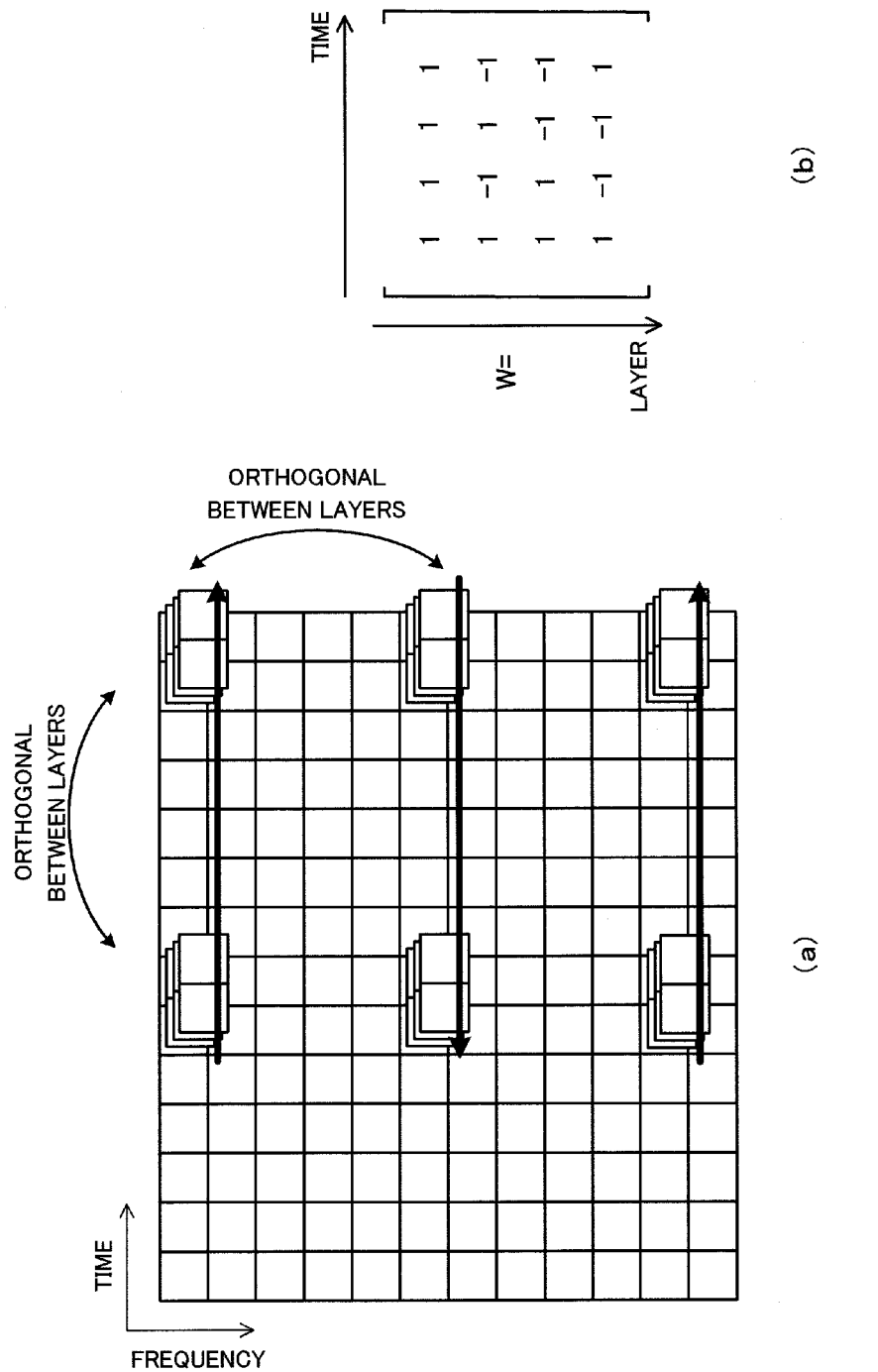
FIG. 9 is a conceptual diagram of a reference signal structure.

In the above description, the DM-RS-s are orthogonalized by multiplying the DM-RS sequences by the first and second orthogonal codes (W0, W1). However, the two-dimensional orthogonal code W=[W0, W1] itself may be used as DM-RS sequences. In this case, the processing of multiplying the DM-RS sequences by the first and second orthogonal codes (W0, W1) can be deleted. Further, in the above description, the orthogonal codes W0, W1 are used to realize two-dimensional orthogonal codes. In the present invention, as illustrated in FIG. 9(a), an orthogonal code is multiplied by a time domain and its multiplication direction (direction of the straight arrow in FIG. 9(a)) is replaced with the frequency domain alternately thereby to generate a two-dimensional orthogonal code (see FIG. 9(b)). Even with this method, it is possible to generate codes that orthogonal to each other, whichever of time and frequency is selected for inverse spread processing.

Figure 14:
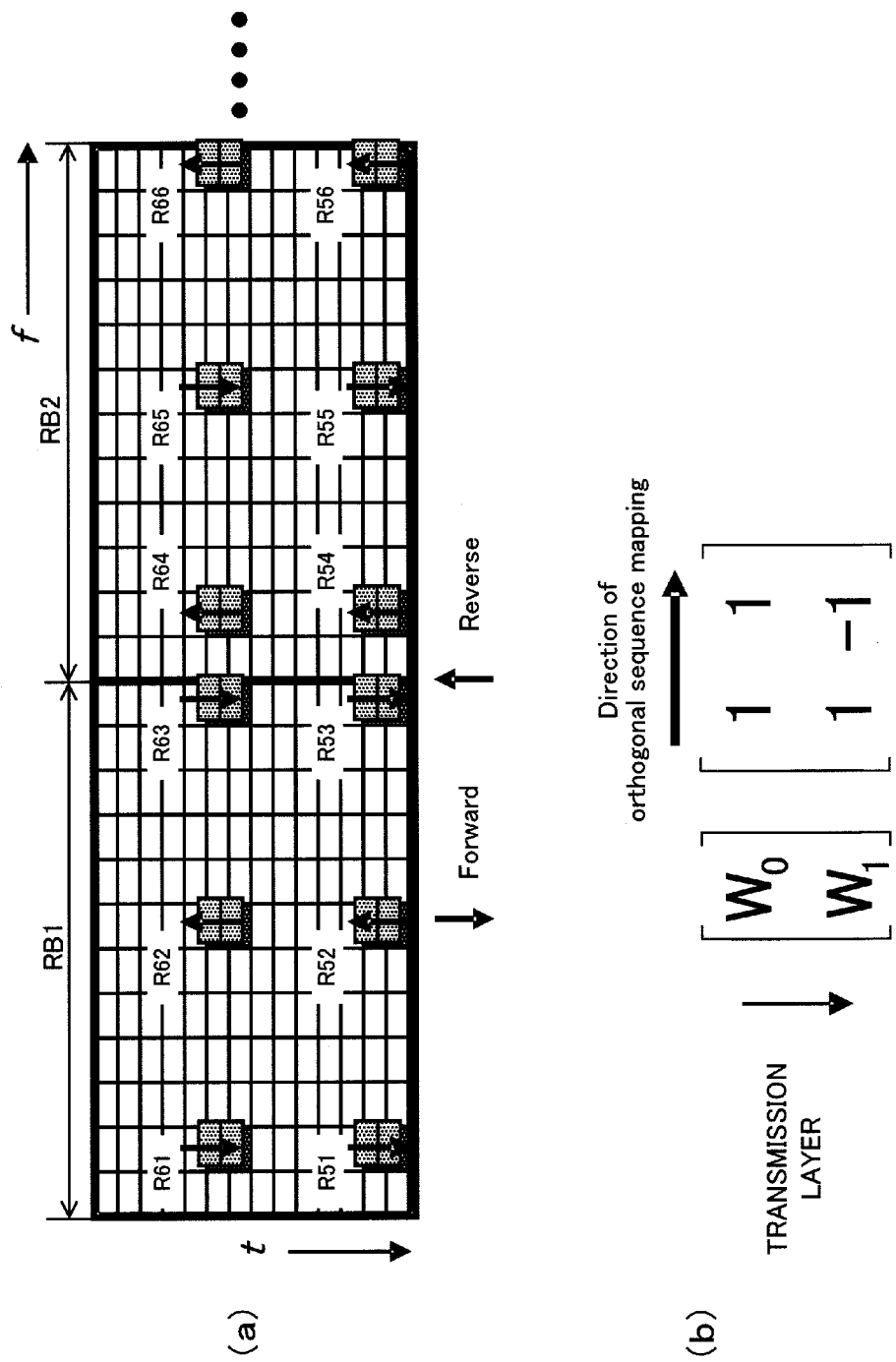
FIG. 14 is an explanatory view of orthogonalizing when there are two transmission layers.

Here, with reference to FIGS. 14 to 19, orthogonalizing realized by interchanging two-dimensional orthogonal codes in the multiplying direction will be described concretely. FIGS. 14(a) and 14(b) are explanatory views of orthogonalizing when there are two transmission layers. In the following description, it is assumed that orthogonalizing of DM-RSs of the transmission layer #1 in the time direction and frequency direction is realized by interchanging of the two-dimensional orthogonal codes shown in FIG. 9(b) in the multiplying direction. Accordingly, description is made about orthogonalization using two dimensional orthogonal codes of the transmission layer #2 on the basis of the two-dimensional orthogonal codes of the transmission layer #1.

As illustrated in FIG. 14(a), three allocation resources R51-R53 are arranged as equally separated from each other in the frequency direction in the resource block RB1. The allocation resources R61-R63 are arranged at the same subcarriers as the allocation resources R51-R53 and as separated by a predetermined number of symbols in the time direction from them. Besides, three allocation resources R54-R56 and three allocation resources R64-R66 are arranged in the same way in the resource block RB2 adjacent to the resource block RB1.

As illustrated in FIG. 14(b), the two-dimensional orthogonal code $W_1$ used in the transmission layer #2 is orthogonal to the two-dimensional orthogonal code $W_0$ used in the transmission layer #1. Here, in FIG. 14(b), the two-dimensional orthogonal code $W_0$ of the transmission layer 1 as a basis is (1, 1), however, it is given for an illustrative purpose to specify the orthogonal relationship with the two-dimensional orthogonal code $W_1$, for convenience of explanation. Accordingly, in the transmission layer #1, the DM-RSs are orthogonalized in the time and frequency directions like in the transmission layer #2.

In this case, successive symbols of the allocation resource R51 illustrated in FIG. 14(a) are multiplied by codes of the two-dimensional orthogonal code W1 sequentially in the forward direction with respect to the time indicated by the arrow. In the same way, successive symbols of the allocation resource R61 are multiplied by codes of the two-dimensional orthogonal code W1 sequentially in the forward direction with respect to the time indicated by the arrow. Further, the symbols at the allocation resources R52 and R62 adjacent in the frequency direction to the allocation resources R51 and R61, respectively, are multiplied by codes of the two-dimensional orthogonal code W1 sequentially in the reverse direction to the time direction and multiplying direction is interchanged. That is, in the same transmission layer, the two-dimensional orthogonal code is mapped to a resource element group of the downlink reference signal of the same frequency domain, and the mapping directions of the codes are opposite in resource element groups adjacent in the frequency direction. Here, the resource element groups are, allocation resources R51 and R61, the allocation resources R52 and R62, the allocation resources R53 and R63, the allocation resources R54 and R64, the allocation resources R55 and R65, and the allocation resources R56 and R66.

At this time, in the allocation resource R51, the code (−1) is mapped to the first resource element in the forward direction, and the code (1) is mapped to the following resource element. In the allocation resource R61, the code (−1) is mapped to the first resource element in the forward direction, and the code (1) is mapped to the following resource element. Between the allocation resources (R51, R61), two combinations of the codes (1, −1) are used in orthogonalizing of the DM-RSs.

In the allocation resource R52, the code (1) is mapped to the first resource element in the reverse direction and the code (−1) is mapped to the following resource element. In the allocation resource R62, the code (1) is mapped to the first resource element in the reverse direction and the code (−1) is mapped to the following resource element. Accordingly, also between the allocation resources (R51, R52) and (R61, R62), the DM-RSs are orthogonalized by two combinations of codes (1, −1). Besides, also between other allocation resources, the same relation is shown. In this way, the two-dimensional orthogonal code $W_1$ is multiplied by the time domain and the multiplying direction is interchanged in the frequency domain so that the DM-RSs can be orthogonalized in the time direction, frequency direction and between the transmission layers #1, #2.

Figure 15:
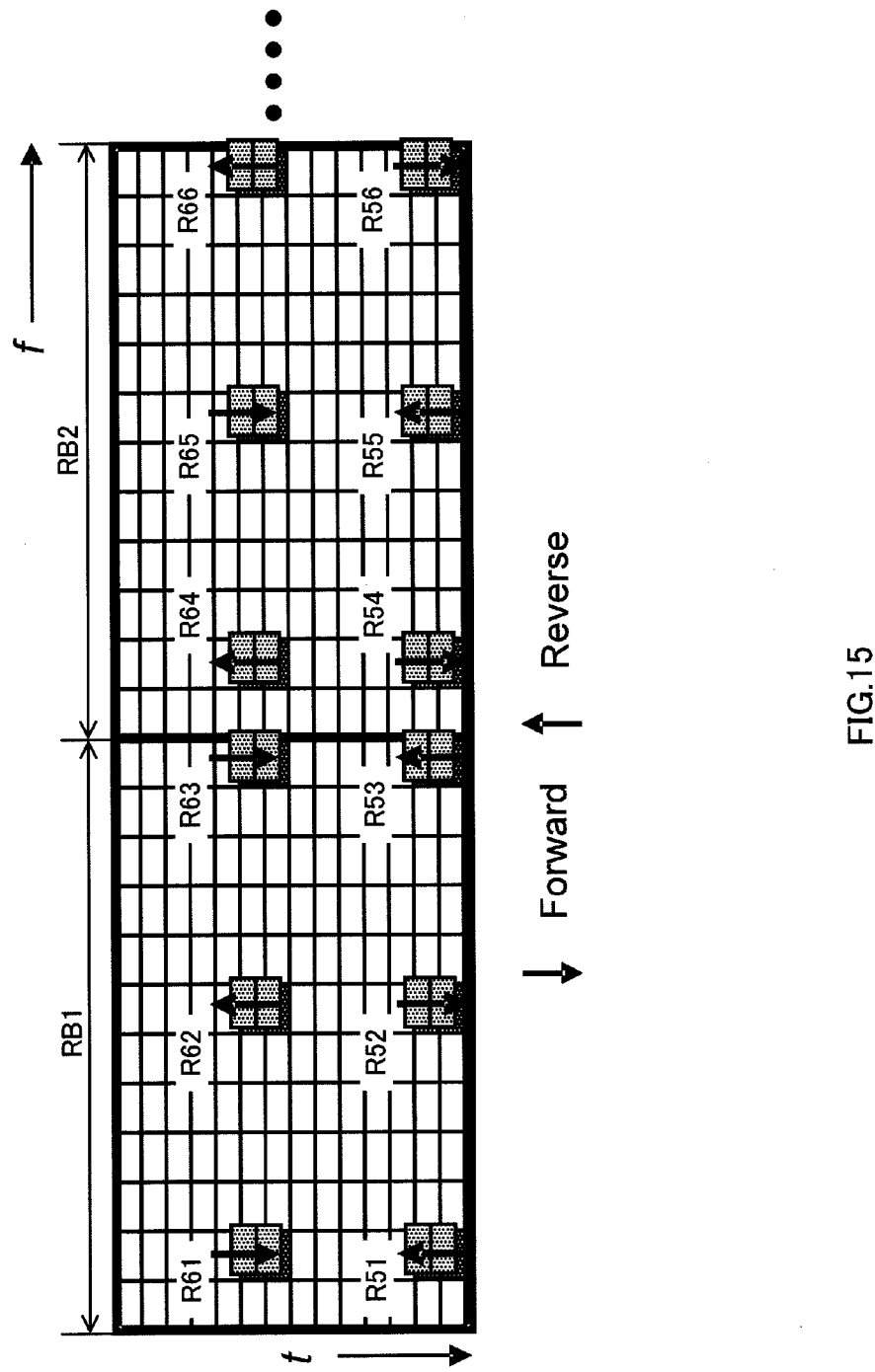
FIG. 15 is an explanatory view of another pattern for orthogonalizing when there are two transmission layers.

Here, orthogonalizing may be realized by reversing the multiplying direction of the two-dimensional orthogonal code in the frequency domain, as well as by reversing the multiplying direction of the two-dimensional orthogonal code in the time and frequency domains as illustrated in FIG. 15. In other words, in the same transmission layer, the two-dimensional orthogonal code is mapped to resource element groups of downlink reference signals of the same frequency domain and the code mapping directions are opposite in the resource element groups adjacent in the frequency and time directions. Here, the resource element groups are allocation resources R51 to R56, R61 to R66. For example, in the allocation resource R51, the code (1) is mapped to the first resource element in the time direction and the code (−1) is mapped to the following resource element. In the allocation resource R61, the code (−1) is mapped to the first resource element and the code (1) is mapped to the following resource element. Accordingly, between the allocation resources (R51, R61), the DM-RSs are orthogonalized by two combinations of code (1, −1).

Further, at the allocation resource R52, the code (−1) is mapped to the first resource element in the time direction and the code (1) is mapped to the following resource element. Accordingly, between the allocation resources (R51, R52), the DM-RSs are orthogonalized by two combinations of code (1, −1). Also between other allocation resources, the same relation can be shown. With this structure, it is possible to realize orthogonalizing of DM-RSs in the time direction, frequency direction and between the transmission layers #1, #2.

Next description is made specifically about the orthogonalization performed by interchanging two-dimensional orthogonal codes in the multiplying direction when there are four transmission layers. First description is given about a first orthogonal pattern. FIGS. 16(a) and 16(b) are explanatory views of the first orthogonal pattern when there are four transmission layers. In the following description, it is assumed that the DM-RSs in the transmission layer #1 are orthogonalized in the time direction and frequency direction and explanation is made about orthogonalizing of a higher-level transmission layer on the basis of two-dimensional orthogonal codes used in the transmission layer #1.

As illustrated in FIG. 16(a), in the resource block RB1, there are three allocation resource blocks R7a-R7c are arranged equally separated from each other in the frequency direction. And allocation resources R8a-R8c are arranged at the same subcarriers as the allocation resources R7a-R7c, respectively, and separated from them by a predetermined number of symbols in the time direction. Further, in each of resource blocks RB2, RB3 and RB4 adjacent to the resource block RB1, three allocation resources R7d-R71 and three allocation resources R8d-R81 are arranged as equally separated from each other in the same manner.

As illustrated in FIG. 16(b), two-dimensional orthogonal codes $X_1$, $X_2$ and $X_3$ used in the transmission layers #2, #3 and #4 are orthogonal in layers to the two-dimensional orthogonal code $X_0$ used in the transmission layer #1. Here, in FIG. 16(b), it is assumed that the two-dimensional orthogonal code $X_0$ of the transmission layer 1 as a basis is (1, 1, 1, 1), and this is given for an illustrative purpose to clarify the orthogonal relation with the two-dimensional orthogonal codes $X_1$, $X_2$, $X_3$ for convenience of explanation. Accordingly, in the transmission layer #1, the DM-RSs are orthogonal to each other in the time and frequency directions like in the transmission layer #2.

Besides, each of the two-dimensional orthogonal codes $X_1$, $X_2$, $X_3$ is described as combination of first two codes (first code group) and latter two codes (second code group). The first two codes correspond to the triangle arrow indicating the mapping direction (multiplying). The latter two codes correspond to the Λ-shaped arrow indicating the mapping direction (multiplying). For example, for the case of the two-dimensional orthogonal code $X_3$ of the transmission layer #3, the first two codes are (1, 1) and the latter two codes are (−1, −1). Here, description is made about orthogonalizing of the first orthogonal pattern using two-dimensional orthogonal code $X_2$ of the transmission layer #3 for convenience of explanation.

Figure 16:
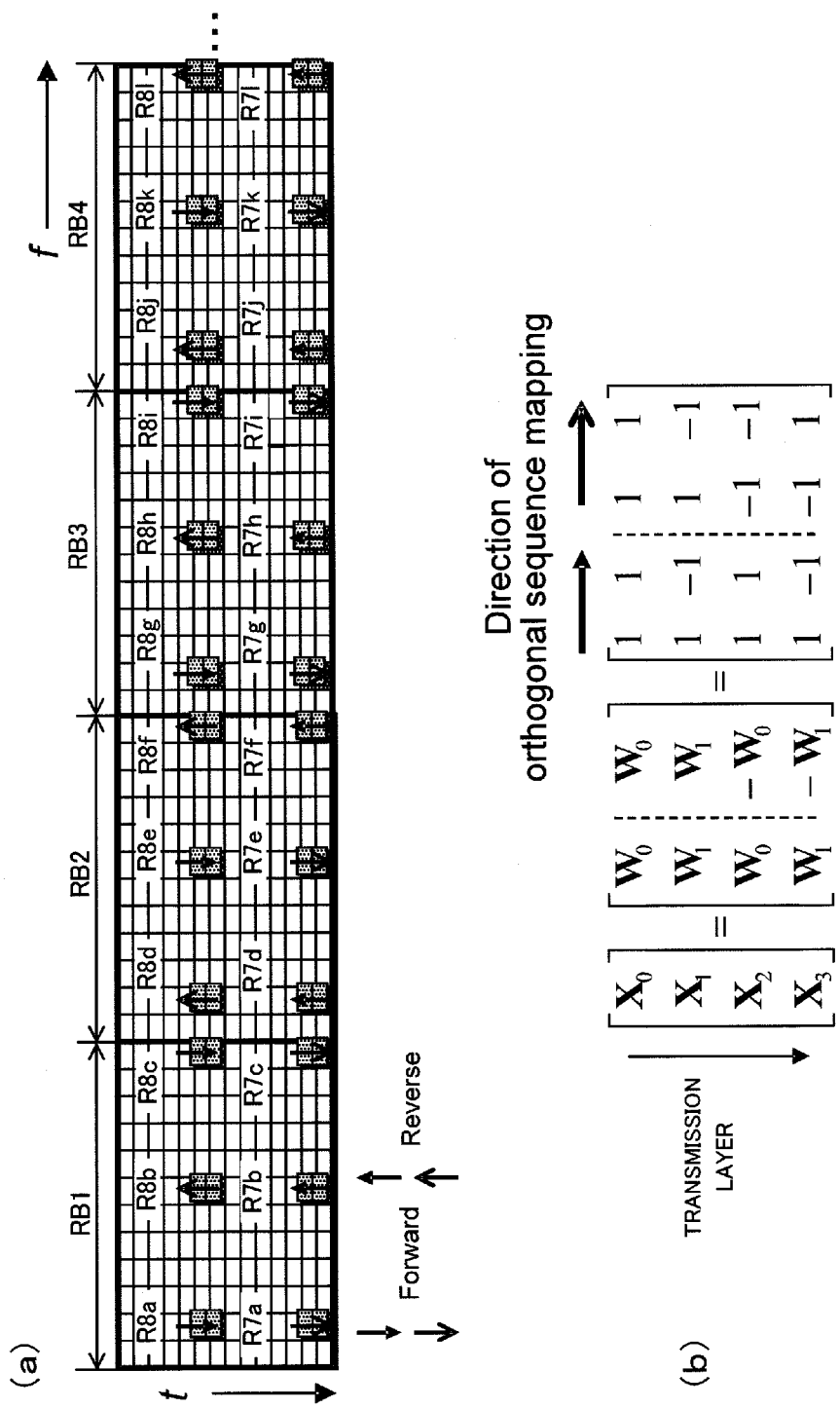
FIG. 16 is an explanatory view of a first orthogonal pattern when there are four transmission layers.

The first orthogonal pattern illustrated in FIG. 16(*a*) is a pattern in which the first two codes and latter two codes are mapped to the resource element groups in this order. Here, the resource element group is a pair of allocation resource R8*n* and R7*n*. That is, this orthogonal pattern is such that first two codes and latter two codes of the two-dimensional orthogonal code $X_2$ are allocated in the time direction and frequency direction alternately and as to the frequency direction, the mapping direction is reversed. For example, in the allocation resource R7*a*, the latter two codes are mapped in the forward direction as indicated by the Λ-shaped arrow. And, in the allocation resource R8*a* adjacent in the time direction to the allocation resource R7*a*, the first two codes are mapped in the forward direction as indicated by the triangle arrow. Besides, in the allocation resource R7*b* adjacent in the frequency direction to the allocation resource R7*a*, first two codes are mapped in the reverse direction as indicated by the triangle arrow. Further, in the allocation resource R8*b* adjacent in the frequency direction to the allocation resource R8*a*, the latter two codes are mapped in the reverse direction as indicated by the Λ-shaped arrow.

At this time, in the allocation resource R7*a*, the code (−1) is mapped to the first resource element in the time direction and the code (−1) is mapped to the following resource element. In the allocation resource R8*a*, the code (1) is mapped to the first resource element in the time direction and the code (1) is mapped to the following resource element. Therefore, the DM-RSs are orthogonalized by two combinations of codes (1, 1) and (−1, −1) between the allocation resources (R7*a*, R8*a*).

Besides, at the allocation resource R7*b*, the code (1) is mapped to the first resource element in the time direction and the code (1) is mapped to the following resource element. In the allocation resource R8*b*, the code (−1) is mapped to the first resource element in the time direction and the code (−1) is mapped to the following resource element. Accordingly, the DM-RSs are orthogonalized by two code combinations (1, 1) and (−1, −1) between allocation resources (R7*a*, R7*b*) and (R8*a*, R8*b*). Further, also between other allocation resources and other transmission layers, the DM-RSs are orthogonalized in the same manner. Thus, in the first orthogonal pattern, the DM-RSs are orthogonalized in the time direction, in the frequency direction and between transmission layers #1 to #4.

As the peak power of the first orthogonal pattern is discussed by the number of codes in which the mapping direction in the frequency direction is the same, it cannot be random in the first orthogonal pattern. For example, between the allocation resources R8*a*-R8*l* adjacent to each other in the frequency direction, (1, 1) is mapped to all of the allocation resources in the forward direction so that the peak power is increased.

Figure 17:
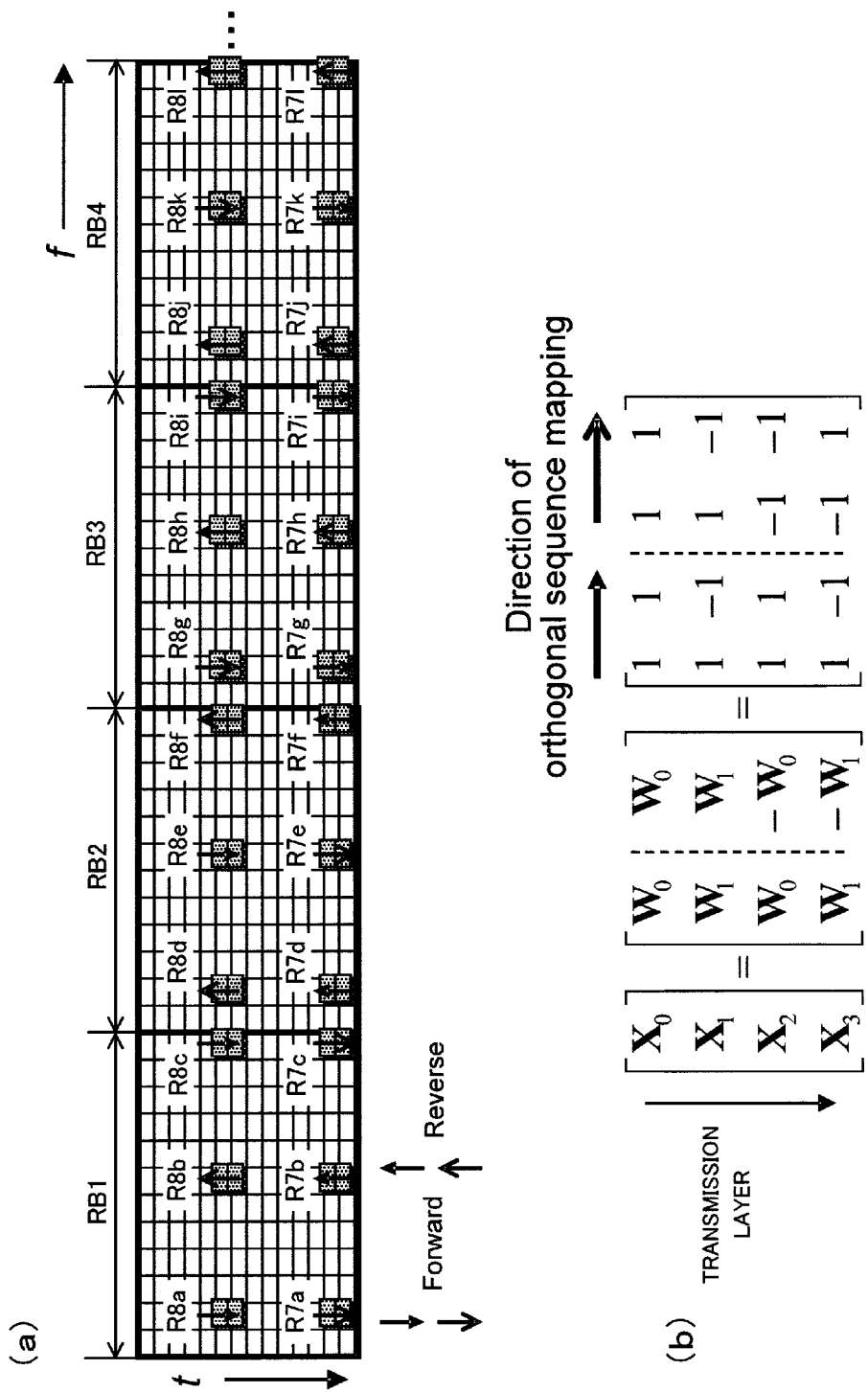
FIG. 17 is an explanatory view of a second orthogonal pattern when there are four transmission layers.

Next, with reference to FIG. 17, description is made about a second orthogonal pattern. FIGS. 17(*a*) and 17(*b*) are explanatory views of the second orthogonal pattern when there are four transmission layers. Here, in the following description, the DM-RSs in the transmission layer #1 are orthogonalized in the time direction and in the frequency direction, and description is made about orthogonalizing in a higher-level transmission layer on the basis of the two-dimensional orthogonal codes used in the transmission layer #1. Here, for convenience of explanation, description is made about orthogonalizing in the second orthogonal pattern using the two-dimensional orthogonal code $X_2$ of the transmission layer #3.

The second orthogonal pattern illustrated in FIG. 17(*a*) is an orthogonal pattern in which the order of the first two codes and latter two codes of the two-dimensional orthogonal code to be mapped to the above-mentioned resource element groups is reversed per plural resource blocks (here, two RBs). In other words, the second orthogonal pattern is realized by the same pattern structure as the first orthogonal pattern, of which the first two codes and the latter two codes of the two-dimensional orthogonal code $X_2$ are interchanged by unit of two resource block RBs. Here, the number of RBs for interchanging the first and last two codes is not limited to two. For example, in the allocation resource R7*a*, the last two codes are mapped in the forward direction as indicated by the Λ-shaped arrow. Besides, in the allocation resource R8*a* adjacent in the time direction relative to the allocation resource R7*a*, the first two codes are mapped in the forward direction as indicated by the triangle arrow. Further, in the allocation resource R7*b* adjacent to the allocation resource R7*a* in the frequency direction, the first two codes are mapped in the reverse direction as indicated by the triangle arrow. Furthermore, in the allocation resource R8*b* adjacent in the frequency direction to the allocation resource 8*a*, the last two codes are mapped in the reverse direction as indicated by the Λ-shaped arrow. In this way, in the resource blocks RB1 and RB2, the orthogonal pattern is the same as the first orthogonal pattern.

On the other hand, in the resource blocks RB3, RB4, the first two codes corresponding to the triangle arrow are interchanged with the last two codes corresponding to Λ-shaped arrow. For example, in the allocation resource R7*g*, the first two codes are mapped in the forward direction as indicated by the triangle arrow. Besides, in the allocation resource R8*g* adjacent in the time direction to the allocation resource R7*g*, the last two codes are mapped in the forward direction as indicated by the Λ-shaped arrow. Further, in the allocation resource R7*h* adjacent in the frequency direction to the allocation resource R7*g*, the last two codes are mapped in the reverse direction as indicated by the Λ-shaped arrow. Furthermore, in the allocation resource R8*h* adjacent to the allocation resource R8*g* in the frequency direction, the first two codes are mapped in the reverse direction as indicated by the triangle arrow.

At this time, in the allocation resource R7*a*, the code (−1) is mapped to the first resource element in the time direction and the code (−1) is mapped to the following resource element. In the allocation resource R8*a*, the code (1) is mapped to the first resource element in the time direction and the code (1) is mapped to the following resource element. Accordingly, between the allocation resources (R7*a*, R8*a*), the DM-RSs are orthogonalized by combination of codes (1, 1) and (−1, −1). In this way, as the first two codes and the last two codes are combined in the time direction, the DM-RSs can be maintained to be orthogonal to each other.

Beside, in the allocation resource R7b, the code (1) is mapped to the first resource element in the time direction and the code (1) is mapped to the last resource element. In the allocation resource R8b, the code (−1) is mapped to the first resource element in the time direction and the code (−1) is mapped to the following resource element. Accordingly, the DM-RSs are orthogonalized also between the allocation resources (R7a, R7b) and (R8a, R8b) by combination of codes (1, 1) and (−1, −1).

However, in the allocation resource R7f, the code (1) is mapped to the first resource element in the time direction and the code (1) is mapped to the following resource element. In the allocation resource R7g, the code (1) is mapped to the first resource element in the time direction and the code (1) is mapped to the following resource element. Accordingly, the DM-RSs are not orthogonalized by two combinations of code (1, 1) between the allocation resources (R7g, R7h).

Besides, in the allocation resource R8f, the code (−1) is mapped to the first resource element in the time direction and the code (−1) is mapped to the following resource element. In the allocation resource R8g, the code (−1) is mapped to the first resource element in the time direction and the code (−1) is mapped to the following resource element. Accordingly, the DM-RSs are not orthogonalized by two combinations of code (−1, −1) between the allocation resources (R8g, R8h).

In this way, in the transmission layer #3 of the second orthogonal pattern, as the first two codes (last two codes) are mapped successively in the frequency direction between the resource blocks RB2, RB3, the DM-RSs are orthogonalized in the resource blocks RB1 and RB2 (RB3 and RB4) but are not orthogonalized partially in the frequency direction. Here, in the transmission layers #2, #4, the DM-RSs are orthogonalized in the time direction and frequency direction, and its detail description is omitted here.

The peak power of the second orthogonal pattern is made random as compared with that of the first orthogonal pattern. That is, the second orthogonal pattern is more random than the first orthogonal pattern as it has the same pattern structure as the first orthogonal pattern and the first two codes and last two codes of the two-dimensional orthogonal code are interchanged by unit of two resource blocks RBs. For example, in the allocation resources R8a-R8f adjacent in the frequency direction of the resource blocks RB1 and RB2, (1, 1) is mapped to all the allocation resources in the forward direction and in the allocation resources R8g-R8l adjacent in the frequency direction of the resource blocks RB3 and RB4, (−1, −1) is mapped to all allocation resources in the forward direction. Accordingly, the peak power is prevented from increasing.

Figure 18:
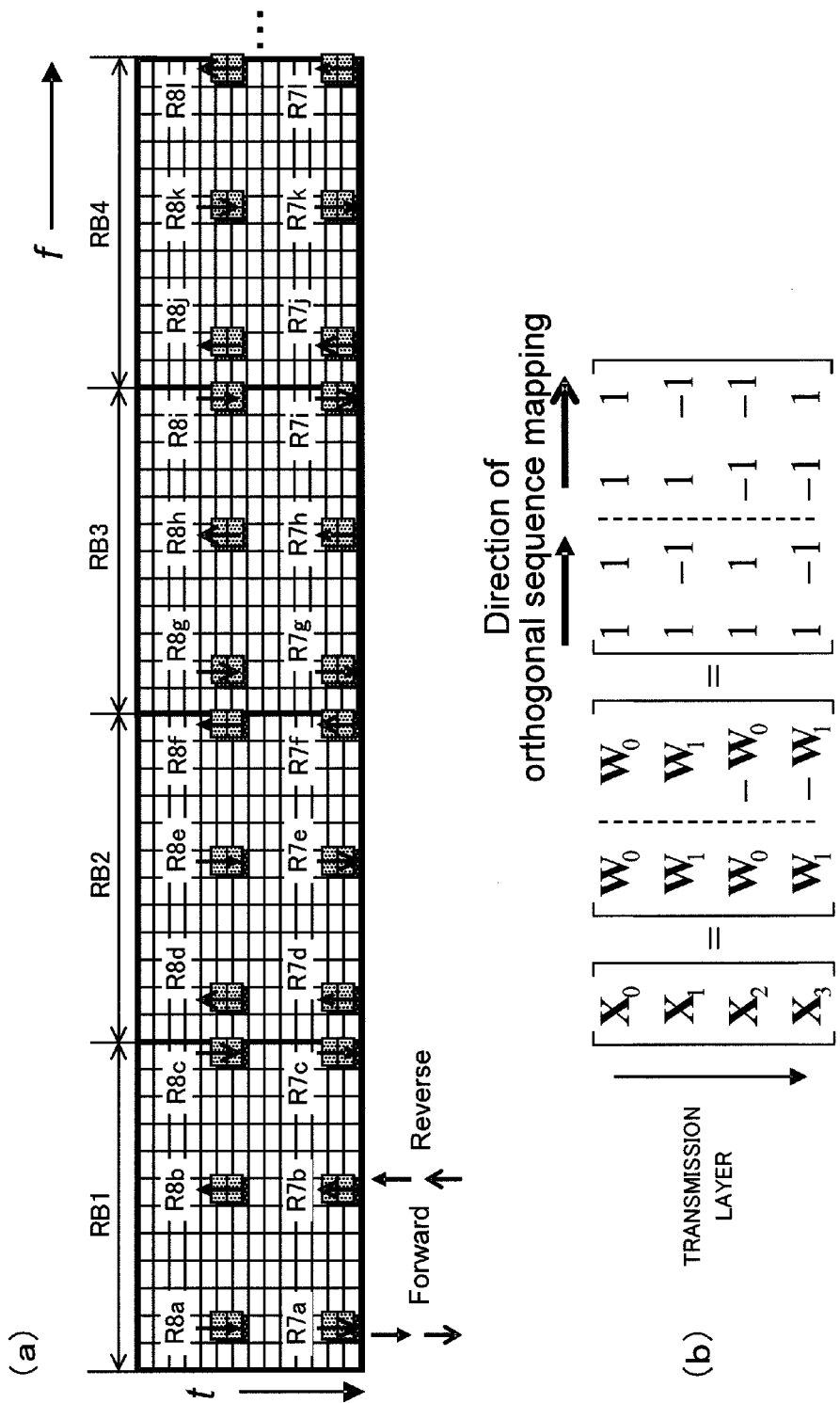
FIG. 18 is an explanatory view of a third orthogonal pattern when there are four transmission layers.

Next, description is made, with reference to FIG. 18, about a third orthogonal pattern. FIGS. 18(a) and 18(b) are explanatory views of the third orthogonal pattern when there are four transmission layers. Here, in the following description, it is assumed that the DM-RSs in the transmission layer #1 are orthogonalized in the time direction and frequency direction and description is made about orthogonalizing of a higher-level transmission layer on the basis of the two-dimensional orthogonal code used in the transmission layer #1. Here, for convenience of explanation, description is made about the orthogonalizing in the third orthogonal pattern using the two-dimensional orthogonal code $X_2$ of the transmission layer #3.

The third orthogonal pattern illustrated in FIG. 18(a) is an orthogonal pattern in which the order of the first two codes and the last two codes of the two-dimensional orthogonal code to be mapped to the above-mentioned resource element groups is reversed. That is, in the third orthogonal pattern, the first two codes and the last two codes of the two-dimensional orthogonal code $X_2$ are allocated in the time direction and in the frequency direction alternately by unit of two allocation resources adjacent in the frequency direction and the mapping direction is reversed in the frequency direction. For example, in the allocation resource R7a, the last two codes are mapped in the forward direction as indicated by the Λ-shaped arrow. Besides, in the allocation resource R8a adjacent in the time direction to the allocation resource R7a, the first two codes are mapped in the forward direction as indicated by the triangle arrow. Further in the allocation resource R7b adjacent in the frequency direction to the allocation resource R7a, the last two codes are mapped in the reverse direction as indicated by the Λ-shaped arrow. Furthermore, in the allocation resource R8b adjacent in the frequency direction to the allocation resource R8a, the first two codes are mapped as indicated by the triangle arrow.

Further, in the allocation resource R7c adjacent in the frequency direction to the allocation R7b, the first two codes are mapped in the forward direction as indicated by the triangle arrow. In the allocation resource R8c adjacent in the frequency direction to the allocation resource 8b, the last two codes are mapped in the forward direction as indicated by the Λ-shaped arrow. In the allocation resource R7d adjacent tin the frequency direction to the allocation resource R7c, the first two codes are mapped in the reverse direction as indicated by the triangle arrow. In the allocation resource R8d adjacent in the frequency direction to the allocation resource R8c, the last two codes are mapped in the reverse direction as indicated by the Λ-shaped arrow.

Then, in the allocation resource 7Ra, the code (−1) is mapped to the first resource element in the time direction and the code (−1) is mapped to the following resource element. In the allocation resource R8a, the code (1) is mapped to the first resource element in the time direction and the code (1) is mapped to the following resource element. Accordingly, between the allocation resources (R7a, R8a), the DM-RSs are orthogonalized by combination of codes (1, 1) and (−1, −1). Thus, the orthogonality of the DM-RSs can be maintained as the first two codes and last two codes are combined in the time direction.

Besides, in the allocation resource R7b, the code (−1) is mapped to the first resource element in the time direction and the code (−1) is mapped to the following resource element. In the allocation resource R8b, the code (1) is mapped to the first resource element in the time direction and the code (1) is mapped to the following resource element. Accordingly, the DM-RSs are not orthogonalized by two combinations of code (−1, −1) between the allocation resources (R7a, R7b). Besides, the DM-RSs are not orthogonalized by two combinations of code (1, 1) between the allocation resources (R8a, R8b).

Further, in the allocation resource R7c, the code (1) is mapped to the first resource element in the time direction and the code (1) is mapped to the following resource element. In the allocation resource R8c, the code (−1) is mapped to the first resource element in the time direction and the code (−1) is mapped to the following resource element. As such, the DM-RSs are orthogonalized by combinations of codes (1, 1) and (−1, −1) between the allocation resources (R7b, R7c) and allocation resources (R8b, R8c). In this way, in the transmission layer #3 of the third orthogonal pattern, as the first two codes (last two codes) of the two-dimensional orthogonal code $X_2$ in the frequency direction are mapped two by two, orthogonalizing of the DM-RSs is realized in the time direction, but not partially in the frequency direction. Here, orthogonalizing of the DM-RSs in the time and frequency directions is realized in the transmission layers #2 and #4, detail description of which is omitted here.

The peak power of the third orthogonal pattern is more random than that of the first orthogonal pattern. That is, the third orthogonal pattern is more random than the first pattern as the first two codes (last two codes) are interchanged by unit of two allocation resources adjacent in the frequency direction. For example, in the allocation resources R8a-R8f adjacent in the frequency direction, (1, 1) and (−1, −1) are mapped alternately to the allocation resources in the forward direction. Accordingly, increase in peak power can be further reduced.

Figure 19:
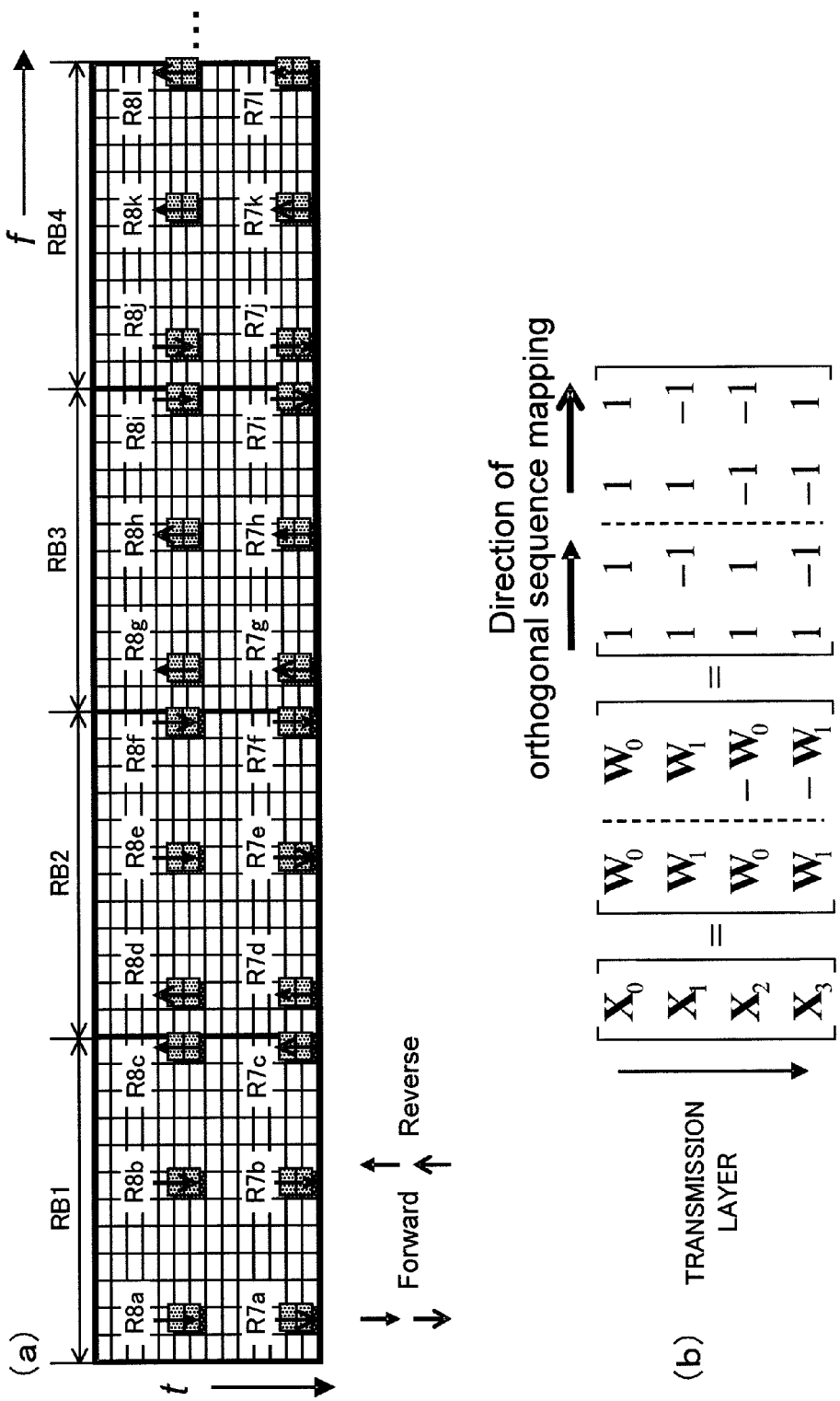
FIG. 19 is an explanatory view of a fourth orthogonal pattern when there are four transmission layers.

Next, with reference to FIG. 19, description is made about a fourth orthogonal pattern. FIGS. 19(a) and 19(b) are explanatory views of the fourth orthogonal pattern when there are four transmission layers. Here, in the following description, it is assumed that the DM-RSs in the transmission layer #1 are orthogonalized in the time direction and frequency direction, and description is made about orthogonalizing of a higher-level transmission layer on the basis of the two-dimensional orthogonal code used in the transmission layer #1. Here, description is made about orthogonalizing in the fourth orthogonal pattern using the two-dimensional orthogonal code $X_2$ of the transmission layer #3, for convenience of explanation.

The fourth orthogonal pattern illustrated in FIG. 19(a) is an orthogonal pattern in which in the same transmission layers, codes of the two-dimensional orthogonal code are mapped to a resource element group of downlink reference signals in the same frequency domains, the code mapping directions are opposite to each other by unit of plural resource element groups (here, two resource element groups) adjacent in the frequency direction, the two-dimensional orthogonal code is divided into first two codes and last two codes, the first two codes and the last two codes are mapped to a resource element group in this order and the order of the first two codes and the last two codes of the two-dimensional to be mapped to the resource element group is changed. That is, the fourth orthogonal pattern is realized by the first two codes and the last two codes of the two-dimensional orthogonal code $X_2$ alternately in the time direction and in the frequency direction and reversing the mapping direction in the frequency direction by unit of two allocation resources. For example, in the allocation resource R7a, the last two codes are mapped in the forward direction as indicated by the Λ-shaped arrow. In the allocation resource R8a adjacent in the time direction to the allocation resource R7a, the first two codes are mapped in the forward direction as indicated by the triangle arrow. Besides, in the allocation resource R7b adjacent in the frequency direction to the allocation resource R7a, the first two codes are mapped in the forward direction as indicated by the triangle arrow. Further, in the allocation resource R8b adjacent in the frequency direction to the allocation resource R8a, the last two codes are mapped in the forward direction as indicated by the Λ-shaped arrow.

Further, in the allocation resource R7c adjacent in the frequency direction to the allocation resource R7b, the last two codes are mapped in the reverse direction as indicated by the Λ-shaped arrow. In the allocation resource R8c adjacent in the frequency direction to the allocation resource R8b, the first two codes are mapped in the reverse direction as indicated by the triangle arrow. In the allocation resource R7d adjacent in the frequency direction to the allocation resource R7c, the first two codes are mapped in the reverse direction as indicated by the triangle arrow. In the allocation resource R8d adjacent in the frequency direction to the allocation resource R8c, the last two codes are mapped in the reverse direction as indicated by the Λ-shaped arrow.

Then, in the allocation resource R7a, the code (−1) is mapped to the first resource element in the time direction and the code (−1) is mapped to the following resource element. In the allocation resource R8a, the code (1) is mapped to the first resource element in the time direction and the code (1) is mapped to the following resource element. As such, between the allocation resources (R7a, R8a), the DM-RSs are orthogonalized by combination of codes (1, 1), (−1, −1). In this way, as the first two codes and the last two codes are combined in the time direction, the DM-RSs are maintained to be orthogonal to each other.

Besides, in the allocation resource R7b, the code (1) is mapped to the first resource element in the time direction and the code (1) is mapped to the following resource element. In the allocation resource R8b, the code (−1) is mapped to the first resource element in the time direction and the code (−1) is mapped to the following resource element. As such, between the allocation resource (R7a, R7b) and (R8a, R8b), the DM-RSs are orthogonalized by combination of codes (1, 1) and (−1, −1). Besides, the same results are obtained in other application resources and other transmission layers. In this way, orthogonalizing of the DM-RSs in the time direction, frequency direction and between the transmission layers #1 to #4 is realized also in the fourth orthogonal pattern.

The peak power of the fourth orthogonal pattern is made more random than that of the first orthogonal pattern. That is, the fourth orthogonal pattern is more random than the first orthogonal pattern as the first and last codes of the same mapping directions are adjacent to each other. For example, in the allocation resources R8a-R8f adjacent in the frequency direction, (1, 1) and (−1, −1) are mapped alternately to the allocation resources adjacent in the forward direction. Accordingly, increase in peak power can be further reduced.

As described above, when there are four transmission layers, orthogonalizing in the time and frequency directions and between the transmission layers #1 to #4 is realized in the first orthogonal pattern, however, the peak power is not random. In the second and third orthogonal patterns, orthogonalizing of the DM-RSs is not realized partially in the frequency direction, but the peak power becomes random as compared with the case of the first orthogonal pattern. In the fourth orthogonal pattern, orthogonalizing in the time and frequency directions and between the transmission layers #1 to #4 is realized and the peak power is made random as compared with the case of the first orthogonal pattern. Besides, as the sets composed of two codes (1) and two codes (−1) are mapped to the resource elements arranged in the time direction and the frequency direction, orthogonalizing of the DM-RSs between the transmission layers #1 to #4, particularly, orthogonalizing in the transmission layer #1 can be achieved in the two dimensions composed of the time and frequency directions.

Figure 20:
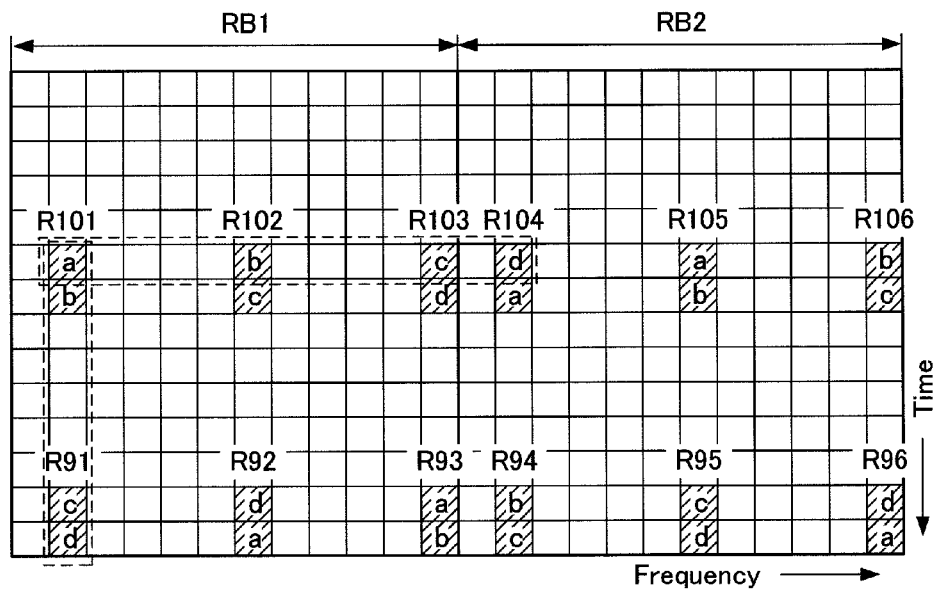
FIG. 20 is an explanatory view of an orthogonal pattern for mapping while cyclic-shifting in the frequency domain.

Besides, description is made by way of example where the structure for generating the two-dimensional orthogonal code by reversing the multiplying direction of the orthogonal codes in the time domain, alternately in the frequency domain. However, in the pre sent invention, as illustrated in FIG. 20, the two-dimensional orthogonal code may be generated by cyclic-shifting the orthogonal code in the frequency domain. With this method, it is also possible to generate the orthogonal codes, no matter which of time and frequency is selected for inverse spread processing. Here, description is made, with reference to FIG. 20, about orthogonalizing realized by cyclic-shifting of the two-dimensional orthogonal codes.

As illustrated in FIG. 20(a), three allocation resources R91-R93 are arranged as equally separated from each other in the frequency direction in the resource block RB1. And, allocation resources R101-R103 are arranged at the same subcarriers of the allocation resources R91-R93, respectively and as separated from them by a predetermined number of symbols in the time direction. Besides, in the resource block RB2 adjacent to the resource block RB1, there are also three allocation resources R94-R96 and three allocation resources R104-R106 arranged as separated in the same matter.

As illustrated in FIG. 20(b), the two-dimensional orthogonal codes $W_1$, $W_2$, $W_3$ used in the transmission layers #2, #3, #4 are orthogonal in layers to the two-dimensional orthogonal code $W_0$ used in the transmission layer #1. Each code of the two-dimensional orthogonal codes $W_1$, $W_2$, $W_3$ is mapped while being shifted in the cyclic direction indicated by the arrow between plural resource element groups arranged in the frequency direction. For example, for the two-dimensional orthogonal code $W_2$ of the transmission layer #3, the cyclic shifting is repeated in the order of (1, 1, −1, −1), (−1, 1, 1, −1), (−1, −1, 1, 1) and (1, −1, −1, 1). The following description is made by way of example of orthogonalizing in the orthogonal pattern using the two-dimensional orthogonal code $W_2$ of the transmission layer #3. Here, in FIGS. 20(a) and 20(b), alphabets a, b, c, d represent correspondence between codes of the two-dimensional orthogonal code and allocation resources.

In the orthogonal pattern illustrated in FIG. 20(a), a resource element group is made of a pair of allocation resources 9n and 10n. In each resource element group 9n, 10n, each code of the two-dimensional orthogonal code $W_2$ is allocated per group. Each code of the two-dimensional orthogonal code W2 allocated to each group is cyclic-shifted by one code in the frequency direction. That is, this orthogonal pattern is realized by in plural resource element groups arranged in the frequency direction, shifting each code of the two-dimensional orthogonal code $W_2$ by one code per resource element group toward the high frequency side and mapping the code. For example, (1, 1, −1, −1) is mapped in the resource element groups R91, R101 and (−1, 1, 1, −1) is mapped to the resource element groups R92, R102 adjacent in the frequency direction to the resource element groups R91, R101.

In this case, in the allocation resource R91, the code (−1) is mapped to the first resource element in the time direction and the code (−1) is mapped to the following resource element. In the allocation resource R101, the code (1) is mapped to the first resource element in the time direction and the code (1) is mapped to the following resource element. As such, in the resource elements R91 and R101, each code of the two-dimensional orthogonal code $W_2$ is mapped. At this time, in the same resource element groups of the other transmission layers #1, #2 and #4, each code of the two-dimensional orthogonal codes $W_0$, $W_1$ and $W_3$ is also mapped. Accordingly, in the resource element groups R91 and R101, orthogonalizing can be realized with other transmission layers #1, #2 and #4 between transmission layers.

In the resource element groups R92 and R102, each code of the two-dimensional orthogonal code $W_2$ cyclic-shifted by one code is mapped. At this time, in the same resource element groups of the other transmission layers #1, #2 and #4, respective codes of the two-dimensional orthogonal codes $W_0$, $W_1$, $W_5$ cyclic-shifted by one code are mapped. Accordingly, in the resource elements R92, R102, orthogonalizing between transmission layers with the other transmission layers #1, #2, #4 is also realized in the frequency direction.

Besides, in the allocation resource R102, the code (−1) is mapped to the first resource element in the time direction and the code (1) is mapped to the following resource element. In the allocation resource R103, the code (−1) is mapped to the first resource element in the time direction and the code (−1) is mapped to the following resource element. In the allocation resource R104, the code (1) is mapped to the first resource element in the time direction and the code (−1) is mapped to the following resource element.

Accordingly, (1, −1, −1, 1) is mapped to a group composed of first resource elements in the transmission direction of the allocation resources R101 to R104, and (1, 1, −1, −1) is mapped to a group of following resource elements. That is, in the resource elements at the same subframe of the allocation resources R101 to R104, each code of the two-dimensional orthogonal code $W_2$ is mapped as shifted by one code to the first elements in the time direction. In this way, when each code of the two-dimensional orthogonal code $W_2$ is cyclic-shifted by one code in the frequency direction, each code of the two-dimensional orthogonal code $W_2$ is also cyclic-shifted by one code in the time direction.

At this time, in the same resource elements of the other transmission layers #1, #2, #4, respective codes of the two-dimensional orthogonal codes $W_0$, $W_1$, $W_5$ are cyclic-shifted by one code and mapped. Accordingly, in the allocation resources R101 to R104, orthogonalizing between transmission layers with the other transmission layers #1, #2, #4 is also realized in the time direction. As described above, in this orthogonal pattern, orthogonalizing of DM-RSs in the transmission layers #1 to #4 is realized in the two-dimensional directions of time direction and frequency direction. Besides, as orthogonalizing between the transmission layers is realized over a wide range covering the four allocation resources, the peak power of the orthogonal pattern is more random as compared with the structure where orthogonalizing between transmission layers is realized by interchanging two-dimensional orthogonal codes in the mapping direction. Accordingly, the peak power is prevented from increasing.

In this way, when the two-dimensional orthogonal codes are cyclic-shifted and mapped, orthogonalizing between the transmission layers #1 to #4 can be realized in two dimensions of time direction and frequency direction, and the peak power can be made random.

As described above, in each of the above-described embodiments, a set composed of two codes (1) and two codes (−1) is mapped to the resource elements arranged in the time and frequency directions. As such, orthogonalizing of the DM-RSs between the transmission layers #1 to #4 can be realized in the two dimensions of time direction and frequency direction.

Further, the above description has been made by way of example of the DM-RS as a downlink reference signal. However, the present invention may be applicable to another reference signal, for example, CSI-RS (Channel State Information-Reference Signal) for CQI measurement and PMI selection. In this case, the multiplexing system of CSI-RS used here is the code division multiplexing (CDM) system.

In the following description, as a modified example of the present embodiment, it is assumed that the present invention is applied to a CSI-RS as a downlink reference signal. Here, the modified example is different from the above-described embodiment only in that the CSI-RSs are orthogonalized in the modified example and the DM-RSs are orthogonalized in the above-described embodiment. This difference is only described in detail below.

Figure 10:
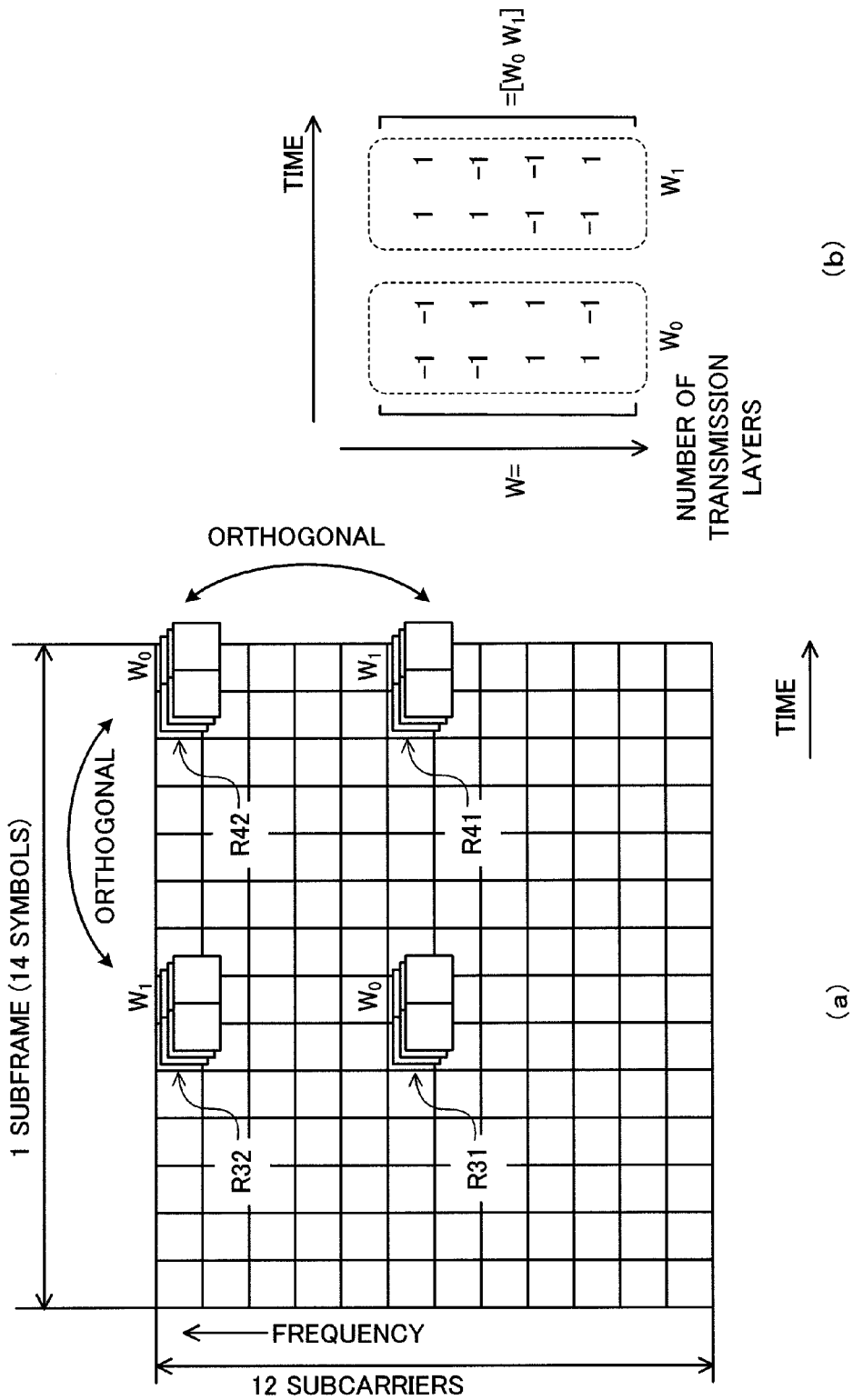
FIG. 10 is a conceptual diagram of a reference signal structure according to a modified example.

FIGS. 10(a) and 10(b) are conceptual diagrams illustrating one example of a downlink reference signal structure proposed by the inventors of the present invention. In FIG. 10(a), two allocation resources R31, R32 are arranged equally separated in the frequency direction within the same resource blocks and allocation resources R41 and R42 are arranged at the same subcarriers as the allocation resources R31, R32, respectively and away from them by a predetermined number of symbols in the time direction. Besides, each allocation resource is expressed as [1 subcarrier×successive two symbols]. Here, the size of each allocation resource is not limited and may be set flexibly, like [two subcarriers×successive two symbols].

In each allocation resource, CSI-RSs of four transmission layers are multiplexed. The CSI-RS multiplexing system is a code division multiplexing system like CSI-RS case, and four CSI-RSs of different transmission layers multiplexed to one allocation resource are orthogonal to each other. Besides, CSI-RSs in each allocation resource are orthogonalized by multiplying by two-dimensional orthogonal code (W=[W0 W1]) illustrated in FIG. 10(b). The two-dimensional orthogonal code is the same as orthogonal code used in orthogonalizing of DM-RSs. The CSI-RSs multiplexed to the allocation resources (R31, R42) are multiplexed with use of the first orthogonal code W0 and the CSI-RSs multiplexed to the allocation resources (R32, R41) are multiplexed with use of the second orthogonal code W1.

Accordingly, the CSI-RSs multiplexed to the allocation resources are orthogonalized between allocation resources (R31, R32) and allocation resources (R41, R42) that are adjacent in the frequency axis direction. Besides, the CSI-RSs multiplexed to the allocation resources are also orthogonalized between allocation resources (R31, R41) and allocation resources (R32, R42) that are adjacent in the time domain.

Besides, also for CSI-RSs, the two-dimensional codes may be used to orthogonal them in different users like the DM-RS case. In this case, for example, first two codes of the first and second orthogonal codes W0, W1 are allocated to the user UE1 and following two codes are allocated to the user UE2. With this allocation, the CSI-RSs of the transmission layer of the user UE1 and the CIS-RSs of the transmission layer of the user UE2 multiplexed to one allocation resource are orthogonalized to each other. As described above, as the CSI-RSs of the allocation resources (R31, R42) are orthogonalized with use of the first orthogonal code W0 and the CSI-RSs of the allocation resources (R32, R41) are orthogonalized with use of the second orthogonal code W1, it is possible to achieve orthogonalizing between users even in allocation resources adjacent in the frequency axis direction and time axis direction.

In the modified example, it is assumed that the same orthogonal codes as those used in DM-RS orthogonalizing are used in CSI-RS orthogonalizing. However, this is not intended for limiting the present invention. The two-dimensional orthogonal codes may be any codes as far as CSI RSs cab ne orthogonalized in the frequency direction, time direction and between layers, and different orthogonal codes from those used in DM-RS orthogonalizing may be used.

Figure 11:
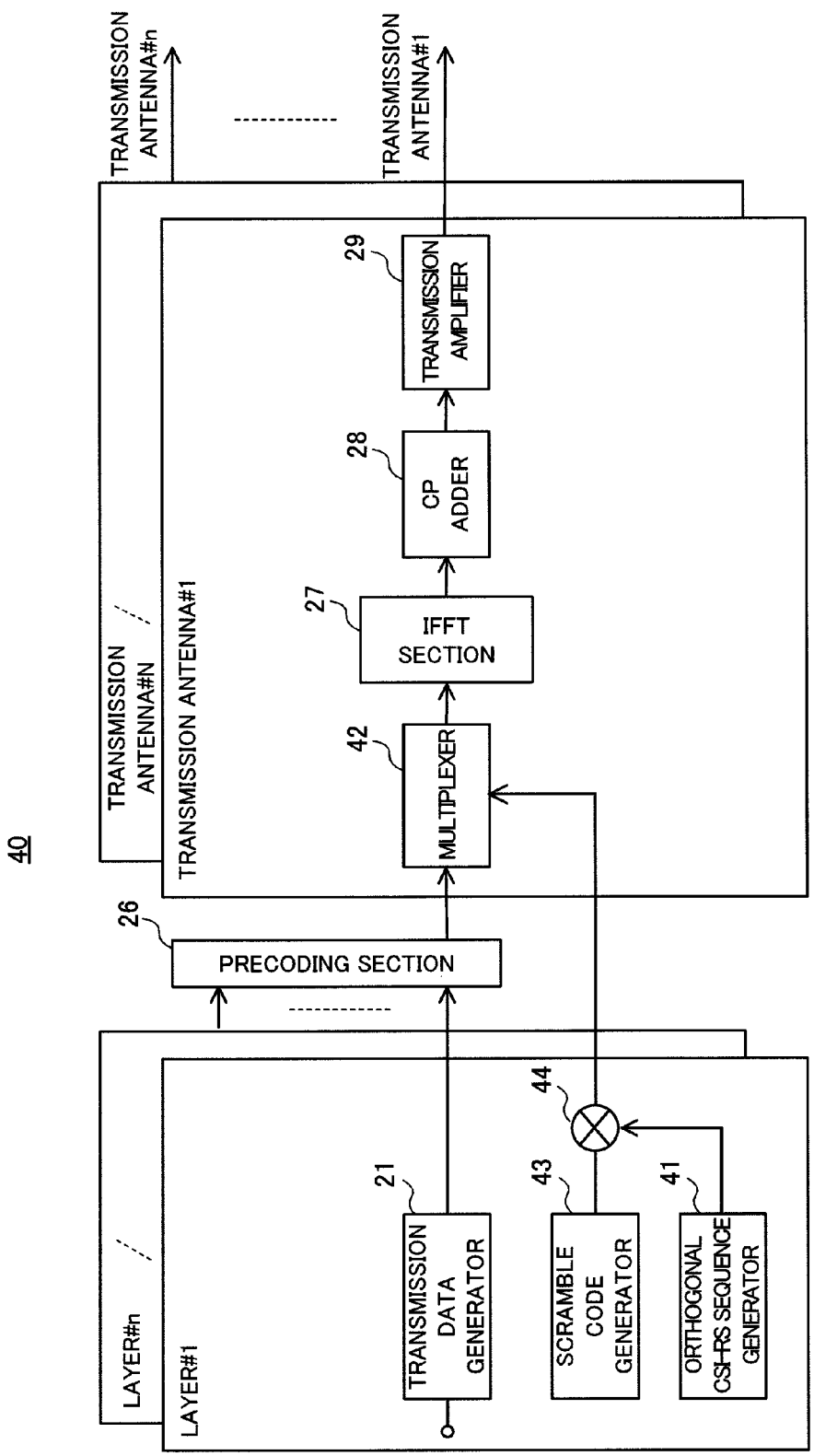
FIG. 11 is a functional diagram of a radio base station device according to the modified example.

With reference to FIG. 11, description is made about a radio base station device 40 according to a modified example. Here, in FIG. 11, the structural elements having the same functions as those in the radio base station device 20 according to the above-described embodiment are denoted by like reference numerals and description thereof is omitted here. The radio base station device 40 has a plurality of transmission antennas #1 to #N, and transmission data and downlink reference signals (containing CSI-RSs) of each transmission layer are simultaneously transmitted from the plural transmission antennas. Here, for convenience of explanation, it is assumed that there are eight transmission antennas. In other words, the maximum number of transmission layers is eight.

The radio base station device 40 according to the modified example has a transmission data generator 21 for generating transmission data, an orthogonal CSI-RS sequence generator 41 for generating orthogonal CSI-RSs, a multiplexer 42 for multiplexing the orthogonal CSI-RSs with transmission data after precoding, a scramble code generator 43 for generating scramble codes and a scramble processing section 44 for scrambling by multiplying the orthogonal CSI-RSs by the scramble codes. In the radio base station device 40, generation of transmission data, generation of orthogonal CSI-RSs, generation of scramble codes and multiplexing of transmission data and orthogonal CSI-RSs are conducted per transmission layer.

The orthogonal CSI-RS sequence generator 41 generates orthogonal CSI-RSs using the two-dimensional orthogonal code (W=[W0 W1]) in the same method as the orthogonal RS sequence generator 22 in the above-described embodiment. Accordingly, description of a method for generating orthogonal CSI-RSs is simplified here. Besides, there are eight orthogonal CSI-RS sequence generators 41 at the maximum that can operate in parallel in accordance with the maximum number of transmission layers (=8). Therefore, in order to distinguish the transmission layers in this description, identification number "#n" is added to each transmission layer.

The orthogonal CSI-RS sequence generators 41 corresponding to the transmission layers #1 to #4 generate orthogonal CSI-RSs by multiplying the CSI-RS sequences of the respective transmission layers by codes of the first orthogonal code W0 in the ascending order of the identification numbers (#1 to #4). As to the codes of the first orthogonal code W0, first code is used first in multiplying. As a result, the orthogonal CSI-RSs that are orthogonal to each other in the different transmission layers #1 to #4 are generated. Besides, the orthogonal CSI-RS sequence generators 42 corresponding to the transmission layers #5 to #8 generate orthogonal CSI-RSs by multiplying the CSI-RSs of respective transmission layers by codes of the second orthogonal code W1 in the ascending order of the identification numbers (#5 to #8). As to the codes of the second orthogonal code W1, first code is used first in multiplying. As a result, the orthogonal CSI-RSs that are orthogonal to each other in the different transmission layers #5 to #8 are generated.

Besides, in the modified example, as illustrated in FIG. 10(a), the four-layer CSI-RSs of the transmission layers #1 to #4 and four-layer CSI-RSs of the transmission layers #5 to #8 are four-layer multiplexed separately. Besides, the allocation resources (R32, R41) multiplexed with the orthogonal CIS-RSs of the transmission layers #5 to #8 and the allocation resources (R31, R42) multiplexed with the orthogonal CIS-RSs of the transmission layers #1 to #4 are arranged in such a manner that they are adjacent both in the frequency direction and in the time direction. Accordingly, in each of transmission layers #1 to #4 and transmission layers #5 to #8, CSI-RSs adjacent in the frequency direction to each other are orthogonalized and CSI-RSs adjacent in the time direction to each other are orthogonalized. In this way, the CSI-RSs can be also orthogonalized in the frequency direction, time direction and between layers by the two-dimensional orthogonal codes.

The above description has been made about the reference signal structure of CSI-RS when the number of transmission layers is equal to 8. The CSI-RSs may be orthogonalized in different users using two-dimensional orthogonal code (W= [W0, W1]) and assuming the maximum number of transmission layers is 4. As the maximum number of transmission layers (=4) can be provided for each of two user terminals UE1 and UE2, totally eight orthogonal CSI-RS sequence generators 41 at the maximum can operate in parallel.

In this case, the orthogonal CSI-RS sequence generator 41 corresponding to a transmission layer of the user terminal UE1 uses the first two codes of the first and second orthogonal codes W0, W1 to generate orthogonal CSI-RSs. Besides, the orthogonal CSI-RS sequence generator 41 corresponding to a transmission layer of the user terminal UE2 uses the following two codes of the first and second orthogonal codes W0, W1 to generate orthogonal CSI-RSs. Consequently, the orthogonal CSI-RSs of the transmission layers #1, #2 of the user terminal UE1 and the orthogonal CSI-RSs of the transmission layers #1, #2 of the user terminal UE2 are multiplexed to the same allocation resource. Besides, the orthogonal CSI-RSs of the transmission layers #3, #4 of the user terminal UE1 and the orthogonal CSI-RSs of the transmission layers #3, #4 of the user terminal UE2 are multiplexed to the same allocation resource.

Also in the inter-user multiplexing, the four-layer CIS-RSs of the transmission layers #1 and #2 of the user terminals UE1 and UE2 and the four-layer CIS-RSs of the transmission layers #3 and #4 of the user terminals UE1 and UE2 are separated and multiplexed by unit of four layers. Besides, the allocation resources (R31, R42) to which the orthogonal CSI-RSs of the transmission layers #1, #2 of the user terminals URE1, UE2 and the allocation resources (R32, R41) to which the orthogonal CSI-RSs of the transmission layers #3, #4 of the user terminals URE1, UE2 are arranged in such a relation that they are adjacent in the time direction and in the frequency direction. Accordingly, in the transmission layers #1, #2 and the transmission layers #3, #4 of the user terminals UE1, UE2, the CSI-RSs adjacent in the frequency direction are orthogonalized and the CSI-RSs adjacent in the time direction are orthogonalized. In this way, orthogonalizing in three directions of frequency direction, time direction and between layers by the two-dimensional orthogonal codes is allowed also in inter-user multiplexing.

The scramble code generator 43 generates scramble codes for making peripheral cell interference random. The scramble processing section 44 multiplies the orthogonal CIS-RSs by the scramble codes in the same way as the scramble processing section 24 of the above-described embodiment. Accordingly, the detail description of the scramble processing is omitted here. As to the scramble method, cell-specific scramble may be applicable. When the cell-specific scramble is applied, a scramble code may be determined by a cell ID of a connecting cell (cell receiving PDCCH) or given from the connecting cell by higher layer signaling (broadcast information and the like).

The multiplexer 42 is provided at the subsequent stage of the precoding section 26 for multiplexing transmission data and the orthogonal CSI-RSs in such a manner as to prevent them from overlapping on one resource block. Here, the transmission data and the orthogonal CSI-RSs are multiplexed per transmission antenna.

The IFFT section 27 performs Inverse Fast Fourier Transform on transmission signals in the frequency domain to which the orthogonal CSI-RSs subcarrier-mapped (subcarrier signals). With the Inverse Fast Fourier Transform, the frequency-component signals allocated to the subcarriers are transformed to the time-component signal sequences. Then, the CP adder 28 adds a cyclic prefix and the transmission amplifier amplifies power. After that, the signals are transmitted from the transmission antennas.

Figure 12:
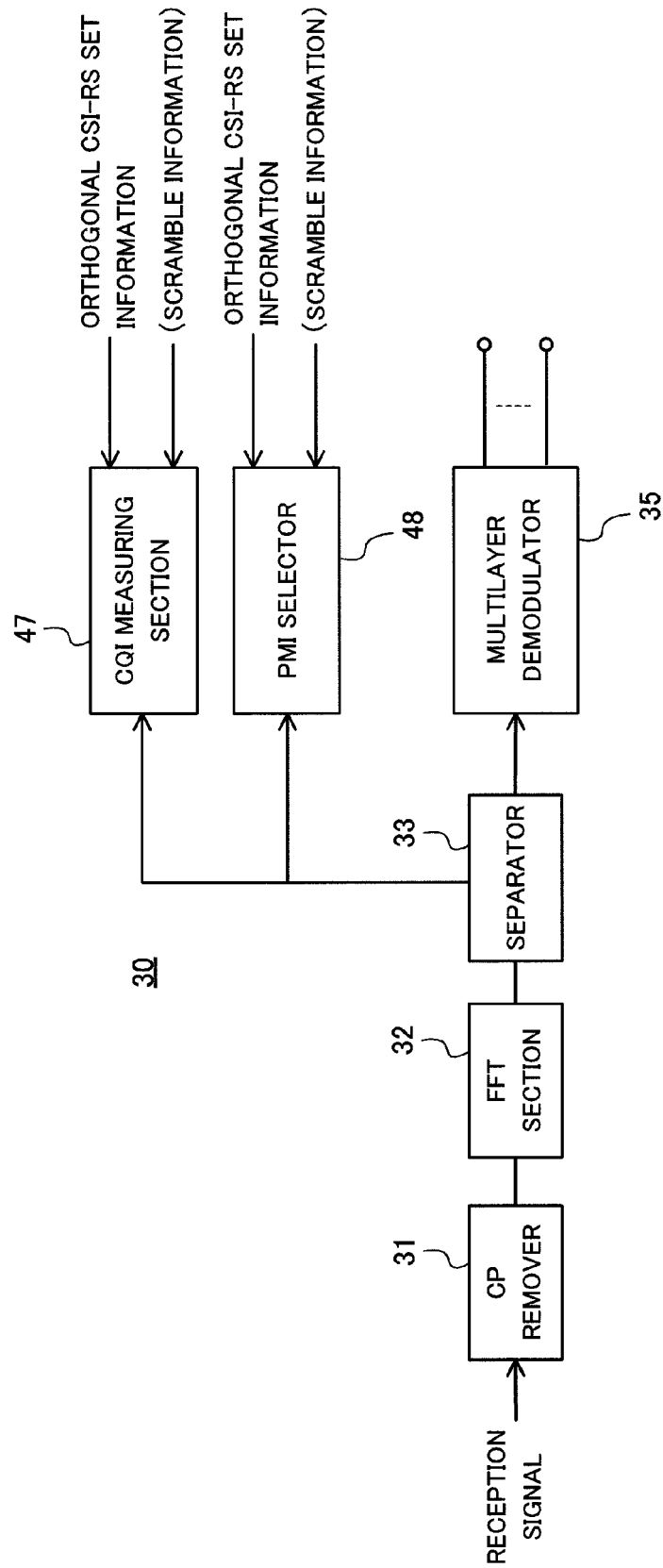
FIG. 12 is a functional diagram of a user terminal according to the modified example.

With reference to FIG. 12, description is made about a user terminal 30 according to the modified example of the present invention. Here, in FIG. 12, structural elements having the same functions as those of the user terminal 10 according to the above-described embodiment are denoted by like reference numerals in the following description. The reception processing system of the user terminal 30 receives signals that are multiplexed with the orthogonal CSI-RSs and transmission data per transmission layer. A reception signal is subjected to removal of a cyclic prefix at a CP remover 31 and Fast Fourier Transform at an FFT 32 in which a time-sequence signal component is transformed to a frequency component line. The reception signal is subcarrier-demapped at a separator 33 into a reference signal for transmitting an RS sequence signal, a control channel for transmitting downlink control signal (for example, PHICH, PDCCH) and a shared channel for transmitting transmission data (for example, PDSCH).

An orthogonal CSI-RS of reception symbols in a reference signal is input to a CQI measuring section 47 and a PMI selector 48. Besides, the PDSCH is a multiplayer demodulator 35 that is a demodulator of downlink transmission data.

The CQI uses CSI-RS sequence information obtained by decoding the PDCCH (or PDSCH) (orthogonal CSI-RS set information or information relating to the two-dimensional orthogonal cods W) to obtain a CSI-RS of a corresponding transmission layer and measures a CQI of the transmission layer using the CSI-RS.

The PMI selector 48 uses the CSI-RS sequence information obtained by decoding the PDCCH (or PDSCH) (orthogonal CSI-RS set information or information relating to the two-dimensional orthogonal cods W) to obtain a CSI-RS of a corresponding transmission layer and selects a PMI of the transmission layer using the CSI-RS.

As described above, according to the modified example, as to CSI-RSs mapped on the resource block in a two-dimensional manner, the CSI-RSs adjacent in the frequency direction in the same transmission layer can be orthogonalized by the orthogonal codes, the CSI-RSs adjacent in the time direction can be orthogonalized by the orthogonal codes and the CSI-RSs mapped to the same allocation resource can be orthogonalized in different transmission layers. That is, it is possible to orthogonalized CSI-RSs in the three ways including the frequency direction, time direction and between layers by simple two-dimensional orthogonal codes and thereby to achieve increase in number of transmission layers and orthogonalizing between users.

Figure 13:
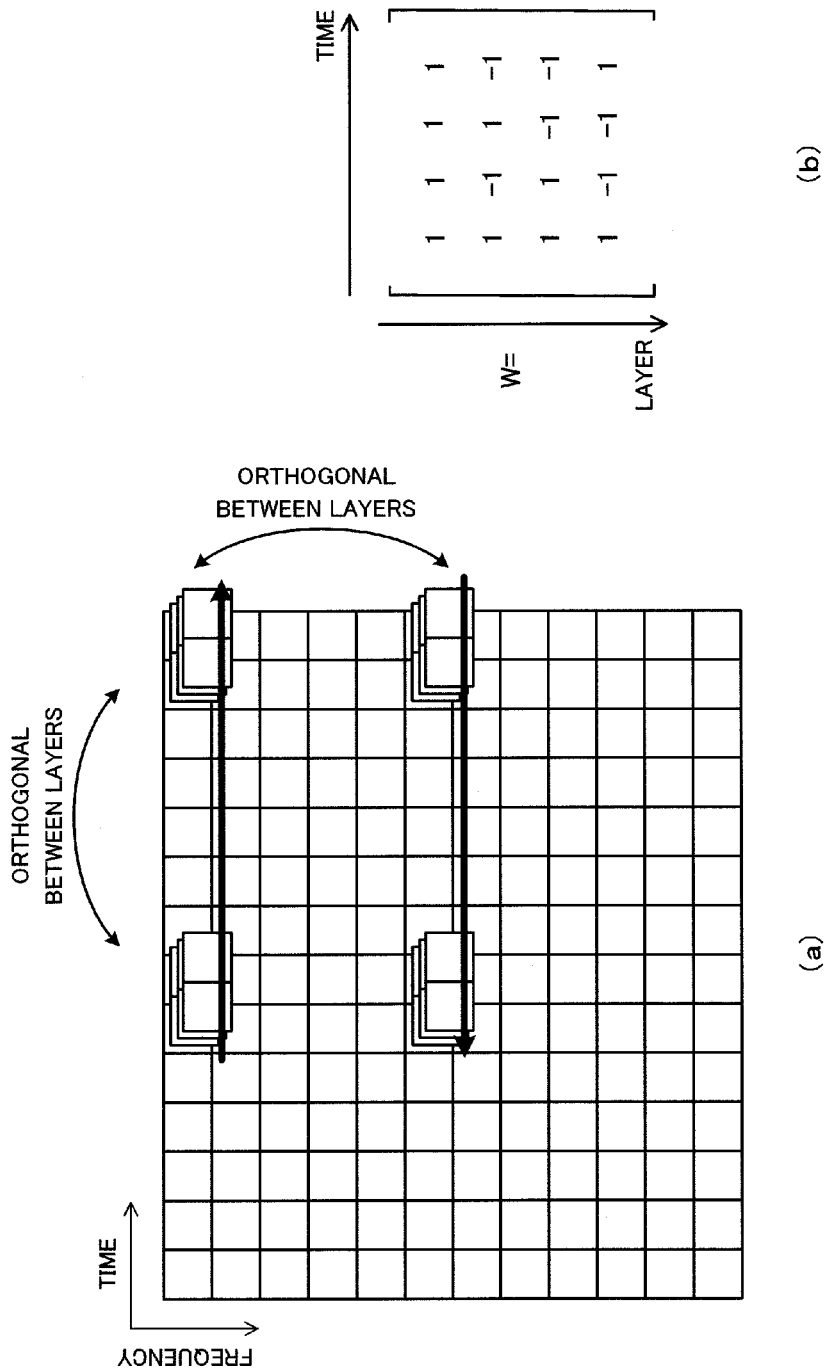
FIG. 13 is a conceptual diagram of a reference signal structure according to a modified example.

In the above description, the CSI-RSs are orthogonalized by multiplying the CSI-RS sequences by the first and second orthogonal codes (W0, W1), however, the two-dimensional orthogonal code W=[W0 W1] itself may be used as CSI-RS sequence. In this case, the processing of multiplying the CIS-RS sequence by the first and second orthogonal codes (W0, W1) can be deleted. Further, the above description has been made with the assumption that the orthogonal codes W0, W1 are used to realize the two-dimensional orthogonal codes, however in the present invention, as illustrated in FIG. 13(a), the two-dimensional orthogonal code may be generated by multiplying the orthogonal codes in the time domain and interchanging its multiplying direction (the direction of the linear arrow in FIG. 13(a)) in the frequency domain alternately. This method also enables to generate the orthogonal codes whichever of time and frequency is selected for inverse spread processing.

Further, the CSI-RSs also can be orthogonalized with application of the above-described orthogonal patterns illustrated in FIGS. 14 to 20.

The present invention is not limited to the above-described embodiments and may be embodied in various modified forms without departing from the scope of the present invention.

INDUSTRIAL APPLICABILITY

The present invention is applicable to a radio communication system including DM-RS and CSI-RS in downlink reference signals.

The present application is based on the Japanese Patent Application No. 2009-149127 filed on Jun. 23, 2009, the Japanese Patent Application No. 2009-231861 filed on Oct. 5, 2009, the Japanese Patent Application No. 2009-252406 filed on Nov. 2, 2009 and the Japanese Patent Application No. 2010-001417 filed on Jan. 6, 2010, the entire contents of which are expressly incorporated by reference herein.

The invention claimed is:

1. A radio base station device wirelessly communicating with a mobile station device, the radio base station device comprising:
   a plurality of transmission antennas;
   a reference signal generator for generating orthogonal downlink reference signals, the orthogonal downlink reference signals using radio resources allocated in two dimensions of frequency direction and time direction, and radio resources that are of same frequency and allocated in the time direction being mapped with orthogonal code for orthogonalization between transmission layers;
   a multiplexer for multiplexing transmission data and the orthogonal downlink reference signals; and
   a transmitter for transmitting transmission signals obtained by multiplexing the transmission data and the orthogonal downlink reference signals at the multiplexer, via the transmission antennas in the transmission layers,
   which the mobile station device having:
      a separator for separating the orthogonal downlink reference signals from reception signals in the transmission layers simultaneously received via the reception antennas;
      a channel estimator for performing channel estimation of each of the transmission layers based on the orthogonal downlink reference signals of the respective transmission layers separated by the separator; and
      a demodulator for demodulating transmission data of each of the transmission layers based on a channel estimation result of the transmission layer by the channel estimator, and
      wherein a mapping direction of the orthogonal codes mapped to the radio resources for the orthogonal downlink reference signals adjacent in the time direction is reversed between the radio resources adjacent in the frequency direction.

2. A mobile station device comprising: a plurality of reception antennas; a separator for separating orthogonal downlink reference signals from reception signals in transmission layers simultaneously received via the reception antennas, the orthogonal downlink reference signals using radio resources allocated in two dimensions of frequency direction and time direction, and radio resources that are of same frequency and allocated in the time direction being mapped with orthogonal code for orthogonalization between the transmission layers;
   a channel estimator for performing channel estimation of each of the transmission layers based on the orthogonal downlink reference signals of the respective transmission layers separated by the separator; and
   a demodulator for demodulating transmission data of each of the transmission layers based on a channel estimation result of the transmission layer by the channel estimator;
   wherein a mapping direction of the orthogonal codes mapped to the radio resources for the orthogonal downlink reference signals adjacent in the time direction is reversed between the radio resources adjacent in the frequency direction.

3. A radio communication method comprising:
   in a radio base station, generating orthogonal downlink reference signals, the orthogonal downlink reference signals using radio resources allocated in two dimensions of frequency direction and time direction, and radio resources that are of same frequency and allocated in the time direction being mapped with orthogonal code for orthogonalization between transmission layers;
   multiplexing transmission data and the orthogonal downlink reference signals in the one transmission layer;
   transmitting transmission signals obtained by multiplexing the transmission data and the orthogonal downlink reference signals, in the transmission layers;
   in a mobile station device, separating the orthogonal downlink reference signals from reception signals in transmission layers simultaneously received via the reception antennas;
   a channel estimator for performing channel estimation of each of the transmission layers based on the orthogonal downlink reference signals of the respective transmission layers separated by the separator; and
   a demodulator for demodulating transmission data of each of the transmission layers based on a channel estimation result of the transmission layer by the channel estimator,
   wherein a mapping direction of the orthogonal codes mapped to the radio resources for the orthogonal downlink reference signals adjacent in the time direction is reversed between the radio resources adjacent in the frequency direction.

4. A radio communication system comprising:
   a radio base station device having: a plurality of transmission antennas; a reference signal generator for generating orthogonal downlink reference signals, the orthogonal downlink reference signals using radio resources allocated in two dimensions of frequency direction and time direction, and radio resources that are of same frequency and allocated in the time direction being mapped with orthogonal code for orthogonalization between transmission layers;
   a multiplexer for multiplexing transmission data and the orthogonal downlink reference signals; and
   a transmitter for transmitting transmission signals obtained by multiplexing the transmission data and the orthogonal downlink reference signals at the multiplexer, via the transmission antennas in the transmission layers; and
   a mobile station device having: a plurality of reception antennas; a separator for separating the orthogonal downlink reference signals from reception signals in the transmission layers simultaneously received via the reception antennas;
   a channel estimator for performing channel estimation of each of the transmission layers based on the orthogonal downlink reference signals of the respective transmission layers separated by the separator;
   and a demodulator for demodulating transmission data of each of the transmission layers based on a channel estimation result of the transmission layer by the channel estimator, wherein a mapping direction of the orthogonal codes mapped to the radio resources for the orthogonal downlink reference signals adjacent in the time direction is reversed between the radio resources adjacent in the frequency direction.

* * * * *